(12) United States Patent
Oota

(10) Patent No.: US 10,569,588 B2
(45) Date of Patent: Feb. 25, 2020

(54) THERMAL TRANSFER SHEET

(71) Applicant: Dai Nippon Printing Co., Ltd., Tokyo (JP)

(72) Inventor: Mitsuhiro Oota, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 16/064,147

(22) PCT Filed: Dec. 22, 2016

(86) PCT No.: PCT/JP2016/088509
§ 371 (c)(1),
(2) Date: Jun. 20, 2018

(87) PCT Pub. No.: WO2017/111097
PCT Pub. Date: Jun. 29, 2017

(65) Prior Publication Data
US 2019/0001725 A1    Jan. 3, 2019

(30) Foreign Application Priority Data

Dec. 25, 2015 (JP) .................. 2015-254934
Dec. 25, 2015 (JP) .................. 2015-254935
Dec. 25, 2015 (JP) .................. 2015-254936

(51) Int. Cl.
| | |
|---|---|
| *B41M 5/40* | (2006.01) |
| *B41J 2/325* | (2006.01) |
| *B41J 31/00* | (2006.01) |
| *B32B 7/06* | (2019.01) |
| *B32B 37/26* | (2006.01) |

(Continued)

(52) U.S. Cl.
CPC .............. *B41M 5/40* (2013.01); *B32B 7/06* (2013.01); *B32B 37/26* (2013.01); *B41J 2/325* (2013.01);
(Continued)

(58) Field of Classification Search
CPC .............. B32B 7/06; B41M 5/42; B41M 5/44
(Continued)

(56) References Cited

U.S. PATENT DOCUMENTS

| | | |
|---|---|---|
| 5,674,805 A | 10/1997 | Simpson et al. |
| 6,308,630 B1 | 10/2001 | Kurokawa et al. |

(Continued)

FOREIGN PATENT DOCUMENTS

| | | |
|---|---|---|
| CN | 101993578 A | 3/2011 |
| JP | S51-001781 A1 | 1/1976 |

(Continued)

OTHER PUBLICATIONS

International Search Report and Written Opinion (Application No. PCT/JP2016/088509) dated Mar. 7, 2017.

(Continued)

*Primary Examiner* — Betelhem Shewareged
(74) *Attorney, Agent, or Firm* — Burr & Brown, PLLC

(57) ABSTRACT

A thermal transfer sheet, which includes a transfer layer, is superposed on a transfer receiving article, and while the transfer layer is continuously transferred onto the article by a printer comprising a sheet supplying device, heating device, sheet winding device, measuring device located between the heating and sheet winding devices to measure the tensile strength of the thermal transfer sheet conveyed along a conveyance path, and release device located between the heating and the measuring devices, under conditions including an applied power for printing: 0.15 W/dot and a conveying speed for the thermal transfer sheet: 84.6 mm/sec., the transfer layer transferred on the article is released from a constituent member in contact with the transfer layer of the thermal transfer sheet, has a tensile strength measured by the measuring device of 0.1 N/cm or less.

2 Claims, 2 Drawing Sheets

(51) Int. Cl.
  *B41M 5/42*    (2006.01)
  *B41M 5/382*   (2006.01)
  *B41M 5/44*    (2006.01)
  *B41M 7/00*    (2006.01)

(52) U.S. Cl.
  CPC .......... *B41J 31/00* (2013.01); *B41M 5/38214* (2013.01); *B41M 5/42* (2013.01); *B41M 5/44* (2013.01); *B41M 5/38257* (2013.01); *B41M 7/0027* (2013.01); *B41M 2205/06* (2013.01); *B41M 2205/10* (2013.01); *B41M 2205/30* (2013.01)

(58) Field of Classification Search
  USPC ...................................................... 428/32.85
  See application file for complete search history.

(56) References Cited

U.S. PATENT DOCUMENTS

| | | | |
|---|---|---|---|
| 6,616,993 B2 | 9/2003 | Usuki et al. | |
| 8,545,949 B2 | 10/2013 | Sekiguchi | |
| 2004/0119204 A1* | 6/2004 | Nishigaki | B29C 45/561 264/328.7 |

FOREIGN PATENT DOCUMENTS

| | | |
|---|---|---|
| JP | S52-080912 A1 | 7/1977 |
| JP | S59-135184 A1 | 8/1984 |
| JP | H02-139294 A1 | 5/1990 |
| JP | H06-262859 A1 | 9/1994 |
| JP | H07-101155 A1 | 4/1995 |
| JP | H09-290576 A1 | 11/1997 |
| JP | H11-263079 A1 | 9/1999 |
| JP | 2001-246845 A1 | 9/2001 |
| JP | 2009-073190 A1 | 4/2009 |
| JP | 2013-166884 A1 | 8/2013 |

OTHER PUBLICATIONS

Chinese Office Action (with English translation), Chinese Application No. 201680073853.5, dated Aug. 2, 2019 (10 pages).

* cited by examiner

THERMAL TRANSFER SHEET

BACKGROUND OF THE INVENTION

1. Field of the Invention

The present invention relates to a thermal transfer sheet.

2. Description of Related Art

There are known various types of thermal transfer sheets for transferring a transfer layer onto a transfer receiving article. For example, thermal transfer sheets suggested in Patent Literatures 1 to 3 are known, such as: (i) a thermal transfer sheet in which a thermally fusible ink layer as the transfer layer is provided on one surface of the substrate, (ii) a thermal transfer sheet in which a receiving layer as the transfer layer is provided on one surface of the substrate (it is referred to as an intermediate transfer medium, occasionally), (iii) a thermal transfer sheet in which a protective layer (it is referred to as an exfoliate layer, occasionally) as the transfer layer is provided on one surface of the substrate (it is referred to as a protective layer transfer sheet, occasionally), and (iv) thermal transfer sheets including an appropriate combination of these structures, for example, a thermal transfer sheet in which a transfer layer of a layered structure including an exfoliate layer and a receiving layer layered in this order from the side of the substrate is provided on one surface of the substrate and a thermal transfer sheet in which a thermally fusible ink layer and a protective layer are provided on the same surface of the substrate so as to be layered in parallel on the substrate across the surface of the substrate, as being frame sequentially. The transfer layer of these thermal transfer sheets is transferred onto a transfer receiving article by superposing such a thermal transfer sheet on the transfer receiving article and heating the other side of the substrate by a heating device such as a thermal head and a heating roller.

The market is now highly demanding printers highly suitable for high-speed printing. Energy applied to a thermal transfer sheet (it is referred to as thermal energy, application energy or the like, occasionally) when a transfer layer is transferred onto a transfer receiving article inside a printer has been steadily increasing. As printers used for transferring the transfer layer of thermal transfer sheets, there are known hot release-type printers that apply energy to a thermal transfer sheet to melt or soften the transfer layer and release only the transfer layer transferred on a transfer receiving article from the thermal transfer sheet before this transfer layer solidifies and cold release-type printers that release only the transfer layer transferred on the transfer receiving article from the thermal transfer sheet after the transfer layer has solidified. Transfer of the transfer layer onto a transfer receiving article is carried out by applying energy to the thermal transfer sheet while the transfer receiving article and the transfer layer of the thermal transfer sheet are kept in close contact to each other to transfer the transfer layer onto the transfer receiving article and releasing the transfer layer transferred on the transfer receiving article from the thermal transfer sheet. Incidentally, in the case where a transfer receiving article and the thermal transfer sheet are thermally fused to each other when the transfer layer of the thermal transfer sheet is transferred onto the transfer receiving article, specifically, in the case where the transfer receiving article and the thermal transfer sheet adhere to each other to such an extent that it is not possible to release the transfer layer transferred on transfer receiving article from the thermal transfer sheet, for example, in the case where the transfer layer and the substrate are thermally fused to each other unintentionally when the thermal transfer sheet in which the transfer layer is provided directly on the substrate is used to transfer the transfer layer onto the transfer receiving article, problems are likely to occur such as rupture of the thermal transfer sheet inside the printer, conveyance failures of the thermal transfer sheet inside the printer (it is referred to as a jam, occasionally), and the like. Particularly, as energy applied to the thermal transfer sheet is increased when the transfer layer is transferred, the occurrence frequency of thermal fusion between the transfer receiving article and the thermal transfer sheet and conveyance failures caused by thermal fusion tends to increase. These problems tend to occur more frequently in hot release-type printers than in cold release-type printers.

Energy applied to the thermal transfer sheet when the transfer layer is transferred onto the transfer receiving article also depends on heating devices and the like. It is thus desirable that a thermal transfer sheet used when a transfer layer is transferred onto a transfer receiving article have a good release property (hereinafter, it is referred to as the release property of the transfer layer) when only the transfer layer transferred on the transfer receiving article is released from the thermal transfer sheet, not only in the case where the energy applied to the thermal transfer sheet is high but also in the case where the energy applied to the thermal transfer sheet is low when the transfer layer is transferred onto the transfer receiving article, that is, regardless the amount of the energy applied to the thermal transfer sheet when the transfer layer is transferred onto the transfer receiving article, in other words, in a wide applied energy field. Under the present circumstances, however, the release property of the transfer layer has not been satisfied in a wide applied energy field, and there is a room for improvement on this respect.

Although various studies have been made to suppress thermal fusion between a transfer receiving article and a thermal transfer sheet, there is a room for improvement on measures for thermal fusion between a transfer receiving article and a thermal transfer sheet, which may occur when the transfer layer of the thermal transfer sheet is transferred onto the transfer receiving article by applying high energy to the thermal transfer sheet.

CITATION LIST

Patent Literature

Patent Literature 1: Japanese Patent Laid-Open No. 9-290576

Patent Literature 2: Japanese Patent Laid-Open No. 11-263079

Patent Literature 3: Japanese Patent Laid-Open No. 2001-246845

SUMMARY OF THE INVENTION

Embodiments of the present disclosure aim principally to provide a thermal transfer sheet capable of solving various problems that may occur between a transfer receiving article and the thermal transfer sheet even in the case where the amount of energy applied to the thermal transfer sheet is increased when the transfer layer is transferred onto the transfer receiving article.

Solution to Problem

The thermal transfer sheet according to an embodiment of the present disclosure for solving the above-mentioned problems is a thermal transfer sheet including a transfer layer located on one surface of a substrate, wherein, in the case where the thermal transfer sheet is superposed on a transfer receiving article, and while the transfer layer is transferred onto the transfer receiving article by use of a printer comprising a thermal transfer sheet supplying device, a heating device, a thermal transfer sheet winding device, a measuring device located between the heating device and the thermal transfer sheet winding device to measure the tensile strength of the thermal transfer sheet conveyed along a conveyance path, and a release device located between the heating device and the measuring device, under conditions including an applied power for printing: 0.15 W/dot and a conveying speed for the thermal transfer sheet: 84.6 mm/sec., the transfer layer transferred on the transfer receiving article is released from a constituent member in contact with the transfer layer of the thermal transfer sheet, the thermal transfer sheet has a tensile strength measured by the measuring device of 0.1 N/cm or less.

The thermal transfer sheet according to another embodiment of the present disclosure for solving the above-mentioned problems is a thermal transfer sheet including a transfer layer located on one surface of a substrate, wherein the transfer layer includes one or two or more layers, among the layers constituting the transfer layer, the layer located nearest the substrate comprises either one or both of (A): (1) a homopolymer of isobutyl (meth)acrylate or (2) a copolymer having a copolymerization ratio of isobutyl (meth)acrylate of 30% or more on a molar basis, and (B): a copolymer of methyl (meth)acrylate and ethyl (meth)acrylate, the copolymerization ratio of the methyl (meth)acrylate in the copolymer of (B) is 60% or more and 90% or less on a molar basis, the copolymerization ratio of the ethyl (meth)acrylate is 10% or more and 40% or less on a molar basis, and when the copolymerization ratio of the methyl (meth)acrylate in the copolymer of (B) is 80% or more on a molar basis, the weight average molecular weight (Mw) of the copolymer is 15000 or less, and meanwhile, when the copolymerization ratio of the methyl (meth)acrylate in the copolymer of (B) is less than 80% on a molar basis, the weight average molecular weight (Mw) of the copolymer is 45000 or less, and wherein, in the case where the thermal transfer sheet is superposed on a transfer receiving article, and while the transfer layer is transferred onto the transfer receiving article by use of a printer comprising a thermal transfer sheet supplying device, a heating device, a thermal transfer sheet winding device, a measuring device located between the heating device and the thermal transfer sheet winding device to measure the tensile strength of the thermal transfer sheet conveyed along a conveyance path, and a release device located between the heating device and the measuring device, under conditions including an applied power for printing: 0.15 W/dot and a conveying speed for the thermal transfer sheet: 84.6 mm/sec., the transfer layer transferred on the transfer receiving article is released from a constituent member in contact with the transfer layer of the thermal transfer sheet, the thermal transfer sheet has a tensile strength measured by the measuring device of 0.1 N/cm or less.

The thermal transfer sheet according to still another embodiment of the present disclosure for solving the above-mentioned problems is a thermal transfer sheet including a transfer layer provided on one surface of a substrate, wherein the transfer layer includes one or two or more layers, among the layers constituting the transfer layer, the layer located nearest the substrate comprises (1) a homopolymer of isobutyl (meth)acrylate or (2) a copolymer having a copolymerization ratio of isobutyl (meth)acrylate of 30% or more on a molar basis.

The thermal transfer sheet according to still even another embodiment of the present disclosure for solving the above-mentioned problems is a thermal transfer sheet including a transfer layer provided on one surface of a substrate, wherein the transfer layer includes one or two or more layers, among the layers constituting the transfer layer, the layer located nearest the substrate comprises a copolymer of methyl (meth)acrylate and ethyl (meth)acrylate, the copolymerization ratio of methyl (meth)acrylate in the copolymer is 60% or more and 90% or less on a molar basis, the copolymerization ratio of ethyl (meth)acrylate is 10% or more and 40% or less on a molar basis, and when the copolymerization ratio of the methyl (meth)acrylate in the copolymer is 80% or more on a molar basis, the weight average molecular weight (Mw) of the copolymer is 15000 or less, and meanwhile, when the copolymerization ratio of the methyl (meth)acrylate in the copolymer is less than 80% on a molar basis, the weight average molecular weight (Mw) of the copolymer is 45000 or less.

Advantageous Effects of Invention

According to the thermal transfer sheet according to the embodiment of the present disclosure, it is possible to solve various problems that may occur between a transfer receiving article and the thermal transfer sheet even in the case where the amount of energy applied to the thermal transfer sheet is increased.

DETAILED DESCRIPTION OF THE INVENTION

Figure 1:
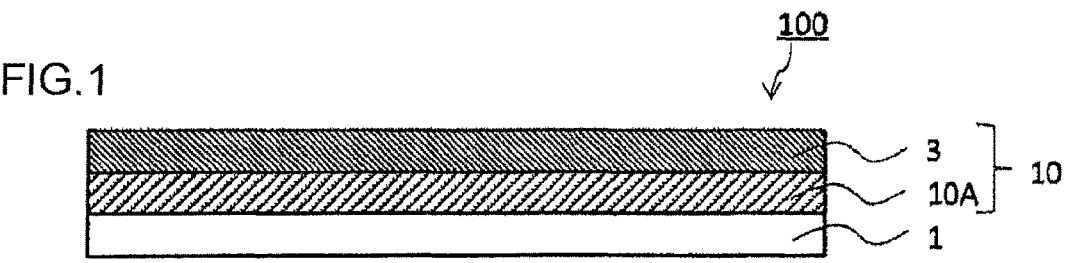
FIG. 1 is a schematic sectional view illustrating one example of a thermal transfer sheet according to an embodiment of the present disclosure.

Embodiments of the present invention now will be described with reference to the drawings and the like. Note that the present invention can be implemented in many different modes and should not be construed as being limited to the description of embodiments illustrated below. In the drawings, components may be shown schematically regarding the width, thickness, shape and the like, in comparison with the actual aspects, for the sake of clearer illustration. The schematic drawings are merely examples and do not limit the interpretations of the present invention in any way. In the specification of the present application and the drawings, components that have substantially the same functions as those described before with reference to previous drawings bear the identical reference signs thereto, and detailed descriptions thereof may be omitted.

Upon describing the thermal transfer sheet according to embodiments of the present disclosure, problems that may occur when the transfer layer of the thermal transfer sheet is transferred onto a transfer receiving article will be described first. One of the problems that may occur when the transfer layer of the thermal transfer sheet is transferred onto a transfer receiving article is thermal fusion between the transfer receiving article and the thermal transfer sheet. The thermal fusion between an transfer receiving article and the thermal transfer sheet referred to herein means a phenomenon in which, in the case where the thermal transfer sheet is superposed on the transfer receiving article, the transfer layer of the thermal transfer sheet is transferred onto the transfer receiving article by applying energy to the thermal transfer sheet side by a heating device such as a thermal head, and only the transfer layer transferred on the transfer receiving article is released from the thermal transfer sheet, a constituent member of the thermal transfer sheet, which should intrinsically remain on the thermal transfer sheet side, is united with the transfer layer transferred on the transfer receiving article, and thus it is not possible to release only the transfer layer transferred on the transfer receiving article from the thermal transfer sheet. For example, thermal fusion means a phenomenon in which, when a thermal transfer sheet in which the transfer layer is provided directly on the substrate is used, the substrate is united with the transfer layer to such an extent that the transfer layer transferred on the transfer receiving article cannot be released from the substrate.

Alternatively, the thermal fusion means a phenomenon in which, even if only the transfer layer transferred on the transfer receiving article can be released from the thermal transfer sheet, the constituent member of the thermal transfer sheet is united with the transfer layer transferred on the transfer receiving article to such an extent that unusual noises occur when the transfer layer is released. When the transfer receiving article and the thermal transfer sheet are thermally fused to each other, such thermal fusion may be responsible for conveyance failures inside a printer, transfer defects, and the like. Alternatively, even when the transfer receiving article and the thermal transfer sheet are thermally fused to each other to a lower extent, the transfer layer transferred on the transfer receiving article can be released from the thermal transfer sheet, but the transfer interface (it is referred to as the release interface, occasionally) of the transfer layer may be roughened to lead to a decrease in the glossiness. Especially, in order to meet high-speed printing suitability, in the case where energy applied to the thermal transfer sheet is increased or in the case where a hot release-type printer is used when the transfer layer is transferred on a transfer receiving article, the transfer receiving article and the thermal transfer sheet tend to be thermally fused to each other.

Figure 2:
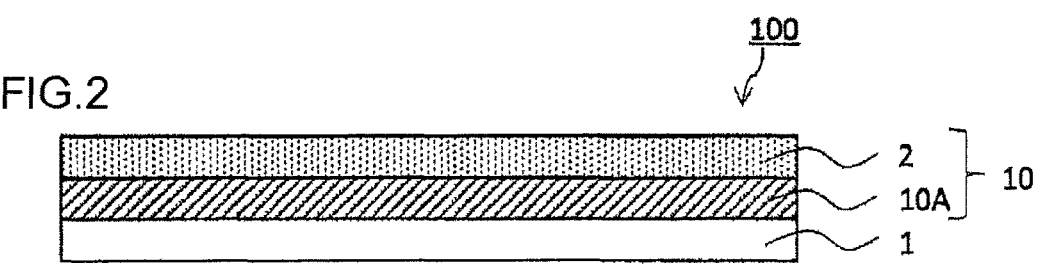
FIG. 2 is a schematic sectional view illustrating one example of the thermal transfer sheet according to an embodiment of the present disclosure.
Figure 3:
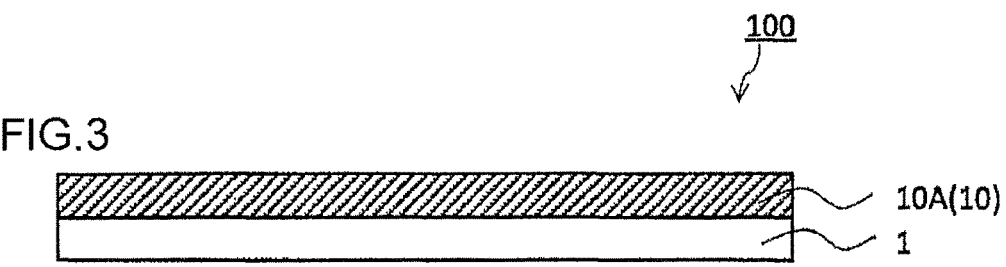
FIG. 3 is a schematic sectional view illustrating one example of the thermal transfer sheet according to an embodiment of the present disclosure.

Then, the thermal transfer sheet according to an embodiment of the present disclosure is a thermal transfer sheet 100 including a transfer layer 10 provided on one surface of a substrate 1, as shown in FIGS. 1 to 3, wherein the transfer layer 10 includes one or two or more layers, among the layers constituting the transfer layer 10, the layer located nearest the substrate 1 comprises (1) a homopolymer of isobutyl (meth)acrylate or (2) a copolymer having a copolymerization ratio of isobutyl (meth)acrylate of 30% or more on a molar basis. Hereinafter, among the layers constituting the transfer layer 10, the layer located nearest the substrate 1 may be referred to as a "base layer", occasionally.

In order to suppress the thermal fusion between a transfer receiving article and the thermal transfer sheet, it is important to improve the release property of the transfer layer when the transfer layer transferred on the transfer receiving article is released from the thermal transfer sheet. Specifically, not only in the case where the energy applied to the thermal transfer sheet is low but also in the case where the energy applied is high when the transfer layer is transferred on a transfer receiving article, in other words, not only in the case where the applied power for printing is low but also in the case where the applied power for printing is high, it is important that the transfer layer has a good release property. However, the release property of the transfer layer is not uniquely determined by the energy applied to the thermal transfer sheet when the transfer layer is transferred. Generally, as the energy applied increases, the release property of the transfer layer tends to decrease. However, even in the case of a thermal transfer sheet of which transfer layer has a good release property when the energy to be applied is increased, the release property of the transfer layer when the energy to be applied is reduced may not be sufficient. Even in the case of a thermal transfer sheet of which transfer layer has a good release property when the energy to be applied is reduced, the release property of the transfer layer when the energy to be applied is increased may not be sufficient. That is, in thermal transfer sheets including a transfer layer suggested so far, the release property of the transfer layer has not been sufficiently satisfied in a wide applied energy field.

Thus, the thermal transfer sheet according to another embodiment of the present disclosure is a thermal transfer sheet 100 including a transfer layer on one surface of the substrate, as shown in FIGS. 1 to 3, wherein the transfer layer includes one or two or more layers, among the layers constituting the transfer layer 10, the layer located nearest the substrate 1 comprises a copolymer of methyl (meth) acrylate and ethyl (meth)acrylate, the copolymerization ratio of methyl (meth)acrylate in the copolymer is 60% or more and 90% or less on a molar basis, the copolymerization ratio of ethyl (meth)acrylate is 10% or more and 40% or less on a molar basis, and additionally, when the copolymerization ratio of methyl (meth)acrylate is 80% or more on a molar basis, the weight average molecular weight (Mw) of the copolymer is 15000 or less, and meanwhile, when the copolymerization ratio of methyl (meth)acrylate is less than 80% on a molar basis, the weight average molecular weight (Mw) of the copolymer is 45000 or less.

The thermal fusion between a transfer receiving article and the thermal transfer sheet has a close relation with the release force when the transfer layer 10 transferred on the transfer receiving article is released from a constituent member in direct contact with the transfer layer among constituent members included in the thermal transfer sheet, for example, in the case where the transfer layer 10 is directly provided on the substrate 1, the release force when the transfer layer 10 is released from the substrate 1. It is thus presumed that such thermal fusion between the transfer receiving article and the thermal transfer sheet can be suppressed by reducing the release force. Incidentally, it is difficult to precisely measure, in a printer, the release force when the transfer layer 10 transferred on the transfer receiving article is released from the constituent member in contact with the transfer layer, and there is a problem that it is not possible to find the critical value of the release force at which thermal fusion occurs between the transfer receiving article and the thermal transfer sheet. Investigation on this problem has found that, in a printer, the release force when the transfer layer 10 transferred on the transfer receiving article is released from the constituent member in contact with the transfer layer correlates with the tensile strength applied to the thermal transfer sheet during the release and that the tensile strength applied to the thermal transfer sheet during the release is in a close relation with the thermal fusion between the transfer receiving article and the thermal transfer sheet.

Figure 7:
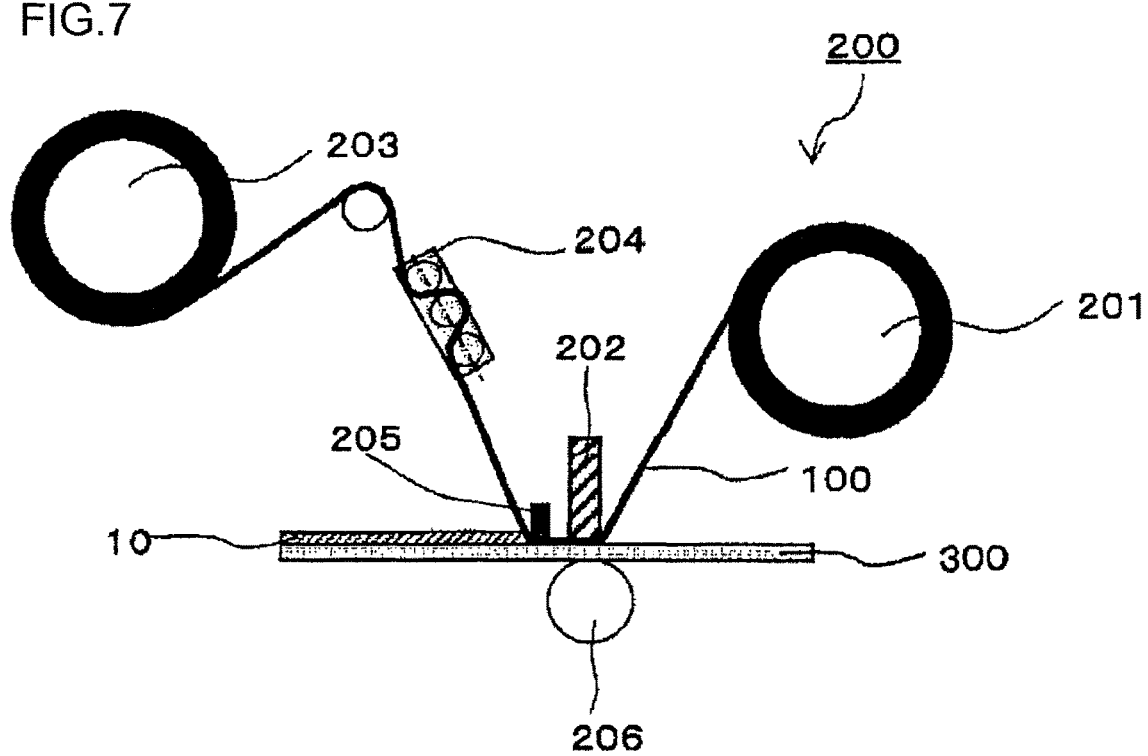
FIG. 7 is a schematic view illustrating one example of a printer used when the transfer layer of the thermal transfer sheet according to an embodiment of the present disclosure is transferred.

Thus, the thermal transfer sheet 100 according to still another embodiment of the present disclosure is a thermal transfer sheet 100 including a transfer layer 10 located on one surface of the substrate 1, wherein, in the case where the thermal transfer sheet 100 is superposed on a transfer receiving article, and while the transfer layer 10 is continuously transferred onto the transfer receiving article 300 by use of a printer 200 comprising a thermal transfer sheet supplying device 201, a heating device 202, a thermal transfer sheet winding device 203, a measuring device 204 located between the heating device 202 and the thermal transfer sheet winding device 203 to measure the tensile strength of the thermal transfer sheet conveyed along a conveyance path, and a release device 205 located between the heating device 202 and the measuring device 204, as shown in FIG. 7, under conditions including an applied power for printing: 0.15 W/dot and a conveying speed for the thermal transfer sheet: 84.6 mm/sec., the transfer layer 10 transferred on the transfer receiving article 300 is released from a constituent member in contact with the transfer layer 10 of the thermal transfer sheet 100, the thermal transfer sheet 100 has a tensile strength measured by the measuring device 204 of 0.1 N/cm or less.

Hereinbelow, specific examples of the thermal transfer sheet according to the embodiments of the present disclosure will be described.

<<Thermal Transfer Sheet of First Embodiment>>

The thermal transfer sheet according to a first embodiment of the present disclosure (hereinbelow, it is referred to as the thermal transfer sheet of the first embodiment, occasionally) has a structure in which a transfer layer 10 is provided on one surface of a substrate 1, as shown in FIGS. 1 to 3. The transfer layer 10 includes one or two or more layers. In the thermal transfer sheet 100 of the first embodiment, among the layers constituting the transfer layer 10, the layer located nearest the substrate 1 comprises (1) a homopolymer of isobutyl (meth)acrylate or (2) a copolymer having a copolymerization ratio of isobutyl (meth)acrylate of 30% or more on a molar basis. FIGS. 1 to 3 are schematic sectional views each illustrating one example of a thermal transfer sheet of the first embodiment. Hereinbelow, among constituent members included in the thermal transfer sheet, the case where the constituent member in direct contact with the transfer layer is the substrate will be mainly described. However, the thermal transfer sheet of the first embodiment is not limited to aspects in which the substrate is in direct contact with the transfer layer, and an optional layer may be provided between the substrate and the transfer layer. In such a case, the optional layer will be the constituent member that comes in direct contact with the transfer layer.

(Meth)acrylate referred in the thermal transfer sheet of the first embodiment means acrylate or methacrylate. Hereinbelow, (1) a homopolymer of isobutyl (meth)acrylate and (2) a copolymer having a copolymerization ratio of isobutyl (meth)acrylate of 30% or more on a molar basis may be collectively referred to as "specific isobutyl (meth)acrylate", occasionally. As shown in FIG. 1, when the transfer layer 10 has a single-layer structure, the transfer layer 10 will be the "base layer" as it is.

According to the thermal transfer sheet of the first embodiment 100 having this feature, incorporation of "specific isobutyl (meth)acrylate" in the "base layer" can suppress the thermal fusion between a transfer receiving article and the thermal transfer sheet without being influenced by various conditions when the transfer layer 10 is transferred onto a transfer receiving article. Especially, in order to meet high-speed printing suitability, in the case where energy applied to the thermal transfer sheet is increased, in other words, the applied power for printing is increased, when the transfer layer 10 is transferred onto an transfer receiving article, or even in the case of reducing the time until release of the transfer layer 10 from the substrate 1 using a hot release-type printer, the thermal fusion between the transfer receiving article and the thermal transfer sheet can be suppressed.

Additionally, the thermal transfer sheet 100 of the first embodiment, which can suppress the thermal fusion between a transfer receiving article and the thermal transfer sheet, can also suppress occurrence of surface roughness when the transfer layer 10 is released from the substrate 1 and can also suppress a decrease in the glossiness of the transfer layer 10 transferred on the transfer receiving article.

The reason why the "base layer" is conditioned to contain "specific isobutyl (meth)acrylate" is that the "base layer" is a layer located on the transfer interface when the transfer layer 10 is transferred, and that, in the case where the "base layer" does not contain the "specific isobutyl (meth)acrylate" and the layers except for the "base layer" among the layers constituting the transfer layer 10 contain the "specific isobutyl (meth)acrylate", it is not possible to suppress the thermal fusion between the transfer receiving article and the thermal transfer sheet, which may occur when the transfer layer is transferred onto the transfer receiving article.

The "base layer" may contain, as the "specific isobutyl (meth)acrylate", either one or both of a homopolymer of isobutyl (meth)acrylate and a copolymer of isobutyl (meth)acrylate and other polymerizing component. The copolymer of isobutyl (meth)acrylate and other polymerizing component is conditioned to be a copolymer having a copolymerization ratio of isobutyl (meth)acrylate of 30% or more on a molar basis. This is because, in the case where the "base layer" contains a copolymer of isobutyl (meth)acrylate and other polymerizing component and the copolymerization ratio of isobutyl (meth)acrylate in the copolymer is less than 30% on a molar basis, it is not possible to suppress the thermal fusion between a transfer receiving article and the thermal transfer sheet, which may occur when the transfer layer is transferred onto the transfer receiving article.

In the thermal transfer sheet 100 of the preferred first embodiment, the "base layer" contains a copolymer having a copolymerization ratio of isobutyl (meth)acrylate of 50% or more on a molar basis.

There is no particular limitation with respect to other polymerizing components included in the copolymer, and alkyl (meth)acrylates such as methyl (meth)acrylate, ethyl (meth)acrylate, butyl (meth)acrylate, lauryl (meth)acrylate, isobornyl (meth)acrylate, 2-ethylhexyl (meth)acrylate, and octyl (meth)acrylate, (meth)acrylic esters having a hydroxyl group in the molecule such as 2-hydroxyethyl (meth)acrylate, 2-hydroxybutyl (meth)acrylate, and 2-hydroxy-3-phenoxypropyl (meth)acrylate, and polymerizable monomers such as styrene may be enumerated. Of these, it can be said that methyl (meth)acrylate and ethyl (meth)acrylate are preferable monomers for constituting the copolymer because, when methyl (meth)acrylate or ethyl (meth)acrylate is used as a monomer constituting the copolymer, the thermal fusion between a transfer receiving article and the thermal transfer sheet can be suppressed more effectively.

The content of the "specific isobutyl (meth)acrylate" contained in the "base layer" is not particularly limited. Thus, it is possible to improve the effect of suppressing the thermal fusion between a transfer receiving article and the thermal transfer sheet, which may occur when the transfer layer 10 is transferred onto the transfer receiving article, depending on the amount of the "specific isobutyl (meth)acrylate" contained. In the preferred thermal transfer sheet 100 of the first embodiment, the "base layer" contains 30% by mass or more, preferably 50% by mass or more of the "specific isobutyl (meth)acrylate" based on the total mass of the "base layer". The upper limit, which is not particularly limited, is 100% by mass.

The weight average molecular weight (Mw) and glass transition temperature (Tg) of the "specific isobutyl (meth)acrylate" are not particularly limited, and the weight average molecular weight (Mw) of the "specific isobutyl (meth)acrylate is preferably 15000 or less, more preferably 13000 or less. The glass transition temperature (Tg) of the "specific isobutyl (meth)acrylate" is preferably 100° C. or less, more preferably 90° C. or less, particularly preferably 80° C. or less, most preferably 70° C. or less.

The weight average molecular weight (Mw) referred to herein means a value measured by gel permeation chromatography using polystyrene as the standard substance, and can be measured by a method in compliance with JIS-K-7252-1 (2008). The glass-transition temperature (Tg) referred to herein means a temperature determined in compliance with JIS-K-7121 (2012) and on the basis of measurement of a change in calorie (DSC method) in accordance with the DSC (differential scanning calorimetry).

There is no particular limitation with respect to a method for forming the "base layer". The base layer can be formed by dispersing or dissolving the "specific isobutyl (meth)acrylate" described above, optional additives used as required, and the like in an appropriate solvent to prepare a coating liquid for base layer, coating this coating liquid for base layer on the substrate 1 or an optional layer located on the substrate 1, and drying the coated liquid. There is no particular limitation with respect to the thickness of the base layer, and the thickness is preferably in the range of 0.1 μm or more and 50 μm or less, more preferably in the range of 0.5 μm or more and 10 μm or less. Setting the thickness of the base layer within this range can more effectively suppress the thermal fusion between a transfer receiving article and the thermal transfer sheet, which may occur when the transfer layer 10 is transferred onto the transfer receiving article.

Next, a transfer layer 10 of a single-layer structure constituted by a "base layer" only and a transfer layer 10 of a layered structure including a "base layer" with demonstrating one example. The transfer layer 10 is a layer transferred onto a transfer receiving article by superposing the thermal transfer sheet of the first embodiment on the transfer receiving article and heating the other side of the substrate 1 by a heating device such as a thermal head and a heating roller (hereinbelow, it is referred to as a heating device). The transfer layer 10 has a layered structure in which two or more layers are layered (see FIGS. 1 and 2) or a single-layer structure constituted by one layer (see FIG. 3).

(Transfer Layer of First Aspect)

As for the transfer layer 10 of a first aspect, the transfer layer 10 of a layered structure in which a "base layer" 10A and a protective layer 3 are layered in this order is located on one surface of a substrate 1, as shown in FIG. 1. The thermal transfer sheet 100 having the transfer layer 10 of the first aspect is used for impart durability, weatherability and the like to an image or the like of a transfer receiving article to be covered with the transfer layer 10 of the first aspect by transferring the transfer layer 10 of the first aspect on the transfer receiving article, serving as a so-called protective layer transfer sheet.

As the "base layer" in the transfer layer 10 of the first aspect, the "base layer" explained above can be used as it is. Thus, a detailed description is omitted here.

(Protective Layer)

As the components in the protective layer 3, acrylic resins, vinyl chloride-vinyl acetate copolymers, epoxy type resins, polyester type resins, polycarbonate type resins, butyral type resins, polyamide type resins, and vinyl chloride type resins may be enumerated.

The protective layer 3 may contain an ultraviolet absorber. According to the protective layer 3 containing an ultraviolet absorber, transferring the transfer layer 10 of the first aspect can improve the lightfastness, weatherability, and the like of the image of a transfer receiving article to be covered with the transfer layer 10 of the first aspect. As the ultraviolet absorber, conventionally known organic ultraviolet absorbers, such as salicylate series, benzophenon series, benzotriazole series, triazine series, substituted acrylonitrile series, nikkel-chelate series, and hindered amine series may be enumerated. Polymer materials prepared by introducing, for example, an addition polymerizable double bond such as a vinyl group, an acryloyl group, or a methacryloyl group or an alcoholic hydroxyl group, an amino group, a carboxyl group, an epoxy group, or an isocyanate group to these ultraviolet absorbers are ultraviolet absorbing resins.

The protective layer 3 can be formed by, for example, dispersing or dissolving the components exemplified above and the like in an appropriate solvent to prepare a coating liquid for protective layer, coating this coating liquid for protective layer on the "base layer" 10A, and drying the coated liquid. There is no particular limitation with respect to the thickness of the protective layer 3, and the thickness is usually in the range of 0.5 μm or more and 50 μm or less.

(Adhesive Layer)

On the protective layer 3, an adhesive layer (not shown) may be located. According to the transfer layer 10 of the first aspect in which an adhesive layer is further located on the protective layer 3, the adhesion between the transfer layer 10 and a transfer receiving article can be improved. As the components of the adhesive layer, conventionally known adhesives mainly based on acrylic resins, vinyl type resins, polyester type resins, urethane type resins, polyamide type resins, epoxy type resins, rubber type resins, and ionomer resins may be enumerated. There is no particular limitation with respect to the thickness of the adhesive layer, and the thickness is preferably in the range of 0.1 μm or more and 50 μm or less, more preferably in the range of 1 μm or more and 10 μm or less.

(Transfer Layer of Second Aspect)

As for the transfer layer 10 of a second aspect, the transfer layer 10 of a layered structure in which a "base layer" 10A and a receiving layer 2 are layered in this order is located on one surface of a substrate 1, as shown in FIG. 2. The thermal transfer sheet 100 having the transfer layer 10 of the second aspect is used for obtaining a print by forming a thermally transferable image on the receiving layer 2 located farthest from the substrate 1, among the layers constituting the transfer layer 10 of the second aspect, and transferring the transfer layer 10 of the second aspect including the receiving layer 2 on which the thermally transferable image is formed on a transfer receiving article, serving as a so-called intermediate transfer medium.

As the "base layer" in the transfer layer 10 of the second aspect, the "base layer" explained above can be used as it is. Thus, a detailed description is omitted here.

(Receiving Layer)

As the components of the receiving layer 2, polyolefin type resins such as polypropylene, halogenated resins such as polyvinyl chloride and polyvinylidene chloride, vinyl type resins such as polyvinyl acetate, vinyl chloride-vinyl acetate copolymers, ethylene-vinyl acetate copolymers, and polyacrylic esters, polyester resins such as polyethylene terephthalate and polybutylene terephthalate, polystyrene type resins, polyamide type resins, copolymers of an olefin such as ethylene or propylene and another vinyl polymer, ionomer or cellulose-based resins such as cellulose diastase, and polycarbonate type resins may be enumerated.

The receiving layer 2 can be formed by dispersing or dissolving the components exemplified above and the like in an appropriate solvent to prepare a coating liquid for receiving layer, coating this coating liquid for receiving layer on the "base layer" 10A, and drying the coated liquid. There is no particular limitation with respect to the thickness of the receiving layer 2, and the thickness is usually in the range of 1 μm or more and 10 μm or less.

Between the "base layer" 10A and the receiving layer 2, an optional layer, for example, an intermediate layer or the like can be provided. Also on the receiving layer 2, an adhesive layer or the like can be provided.

Additionally, the above-described transfer layer 10 of the first aspect and the transfer layer 10 of the second aspect may be combined to form a transfer layer. For example, the transfer layer 10 of a layered structure in which the "base layer", the protective layer 3, and the receiving layer 2 are layered in this order may be located on one surface of the substrate 1 to form a thermal transfer sheet.

(Transfer Layer of Third Aspect)

In the transfer layer 10 of a third aspect, the transfer layer 10 of a single-layer structure constituted singly by a "base layer" 10 is located on one surface of a substrate 1, as shown in FIG. 3.

In the thermal transfer sheet 100 having the transfer layer 10 of the third aspect, it is possible to impart various functions to the thermal transfer sheet 100 by allowing the "base layer" 10A to contain functional components in addition to the above-described "specific isobutyl (meth)acrylate".

For example, the thermal transfer sheet 100 having the transfer layer 10 of the third aspect as a thermally fusible ink layer can be provided by allowing the "base layer" 10A to contain various additives such as a conventionally known colorant, if necessary, a wax component, a mineral oil, a vegetable oil, a higher fatty acid such as stearic acid, a plasticizer, a thermoplastic resin, and a filler together with the "specific isobutyl (meth)acrylate".

As wax components, microcrystalline wax, carnauba wax, and paraffin wax are exemplified. Additionally, Fischer-Tropsch wax, various low molecular weight polyethylenes, tree wax, beeswax, spermaceti, insect wax, wool wax, shellac wax, candelilla wax, petro lactam, polyester wax, partially denatured waxes, fatty acid esters and fatty acid amides may be enumerated.

The colorant may be appropriately selected from known organic or inorganic pigments or dyes. For example, colorants that have a sufficient color density and are not easily discolored or faded by light, heat or the like are preferred. The colorant also may be a substance that develops a color by heating or a substance that develops a color when coming in contact with a component coated on the surface of the transfer receiving article. For example, black colorant may be enumerated.

Meanwhile, a "base layer" having a function as the protective layer can be provided by allowing the "base layer" 10A to contain the components of the protective layer 3 described with respect to the transfer layer 10 of the first aspect described above in addition to the "specific isobutyl (meth)acrylate".

The transfer layer 10 including the "base layer" has been described hereinabove by enumerating various aspects. The thermal transfer sheet 100 of the first embodiment is characterized by being capable of suppressing the thermal fusion between a transfer receiving article and the thermal transfer sheet, which may occur when the transfer layer 10 is transferred onto the transfer receiving article, especially, the thermal fusion between a transfer receiving article and the thermal transfer sheet even in the case where energy applied to the thermal transfer sheet is increased when the transfer layer 10 is transferred to the transfer receiving article, by allowing the "base layer" located nearest the substrate 1 among the layers constituting the transfer layer 10, to contain "specific isobutyl (meth)acrylate". A thermal transfer sheet, if satisfying Condition 1: a transfer layer of a single-layer or a layered structure being provided on one surface of the substrate and Condition 2: the layer located nearest the substrate 1 among the layers constituting the transfer layer containing "specific isobutyl (meth)acrylate", is not limited in any way with respect to any other conditions, and aspects other than those exemplified above may be accepted.

(Optional Layers)

The thermal transfer sheet 100 of the first embodiment may include an optional layer not constituting the transfer layer. As the optional layer, a release layer (not shown) provided between the substrate 1 and the transfer layer 10 in order to improve the transferability of the transfer layer 10, and a back face layer provided on the other surface of the substrate 1 in order to improve the heat resistance and the driving stability of heating members such as a thermal head may be enumerated. For example, in the thermal transfer sheet including the transfer layer 10 of the third aspect described above, a release layer may be provided between the substrate 1 and the "base layer" 10A as the thermally fusible ink layer.

On the same one surface of the substrate 1, a colorant layer (not shown) may be provided in addition to the transfer layer of each aspect described above so as to be layered in parallel on the substrate across the surface of the substrate, as being frame sequentially.

(Substrate)

The substrate 1, which is an essential constituent in the thermal transfer sheet 100 of the first embodiment, is provided in order to support the transfer layer 10 located on one surface of the substrate 1. There is no particular limitation with respect to the material of the substrate 1, but the material desirably endures heat applied when the transfer layer 10 is transferred onto a transfer receiving article and has a mechanical strength to the extent of being able to handle without a hitch. As the substrate 1 like this, various plastic films or sheets such as polyesters such as polyethylene terephthalate, polyarylate, polycarbonate, polyurethane, polyimide, polyether imide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyether sulfone, tetrafluoroethylene-perfluoroalkyl vinyl ether copolymers, polyvinyl fluoride, tetrafluoroethylene-ethylene copolymers, tetrafluoroethylene-hexafluoropropylene copolymers, polychlorotrifluoroethylene, and polyvinylidene fluoride may be enumerated.

There is no particular limitation with respect to the thickness of the substrate 1, and the thickness is generally in the range of 2.5 µm or more and 100 µm or less.

As the substrate 1, a surface-treated substrate may be used. As the surface treatment method, corona discharge treatment, flame treatment, ozone treatment, ultraviolet treatment, radiation treatment, roughening treatment, chemical treatment, plasma treatment, low temperature plasma treatment, primer treatment, and grafting treatment may be enumerated.

(Transfer Receiving Article)

There is no particular limitation with respect to a transfer receiving article onto which the transfer layer 10 of the thermal transfer sheet 100 of the first embodiment is transferred, and plain paper, wood-free paper, tracing paper, plastic films, plastic cards mainly composed of vinyl chloride, vinyl chloride-vinyl acetate copolymers, and polycarbonate, thermal transfer image-receiving sheets, and prints each obtained by transferring the transfer layer of an intermediate transfer medium on an optional object may be enumerated. The same applies to a transfer receiving article onto which the transfer layer 10 of the thermal transfer sheet 100 of a second embodiment or a third embodiment described below is transferred.

(Printer)

There is no particular limitation with respect to a printer used when the transfer layer 10 of the thermal transfer sheet 100 of the first embodiment is transferred onto a transfer receiving article, and any conventionally known printers including heating members such as a thermal head may be used. The thermal transfer sheet 100 of the first embodiment, which can suppress the thermal fusion between a transfer receiving article and the thermal transfer sheet even in the case a printer that can apply high energy or a hot release-type printer is used, is useful particularly when these printers are used. The same applies to printers used when the transfer layer 10 of the thermal transfer sheet of the second embodiment described below is transferred onto a transfer receiving article.

<<Thermal Transfer Sheet of Second Embodiment>>

The thermal transfer sheet according to the second embodiment of the present disclosure (hereinbelow, it is referred to as the thermal transfer sheet of the second embodiment, occasionally) has a structure in which a transfer layer 10 is provided on one surface of a substrate 1, in the same manner as in the thermal transfer sheet 100 of the first embodiment, as shown in FIGS. 1 to 3. The transfer layer 10 includes one or two or more layers. In the thermal transfer sheet 100 of the second embodiment, among the layers included in the transfer layer 10, the layer located nearest the substrate 1 comprises a copolymer of methyl (meth)acrylate and ethyl (meth)acrylate, the copolymerization ratio of methyl (meth)acrylate in the copolymer is 60% or more and 90% or less on a molar basis, the copolymerization ratio of ethyl (meth)acrylate is 10% or more and 40% or less on a molar basis, and additionally, when the copolymerization ratio of methyl (meth)acrylate is 80% or more on a molar basis, the weight average molecular weight (Mw) of the copolymer is 15000 or less, and meanwhile, when the copolymerization ratio of methyl (meth)acrylate is less than 80% on a molar basis, the weight average molecular weight (Mw) of the copolymer is 45000 or less. Hereinafter, all the references to "copolymerization ratio" mean a copolymerization ratio on a molar basis.

In other words, the thermal transfer sheet 100 of the second embodiment is characterized in that the layer located nearest the substrate 1 among the layers constituting the transfer layer 10 contains either one or both of the following copolymer A and copolymer B.

(Copolymer A): The copolymer A is a copolymer of methyl (meth)acrylate and ethyl (meth)acrylate. The weight average molecular weight (Mw) of the copolymer A is 15000 or less, the copolymerization ratio of methyl (meth)acrylate constituting the copolymer A is 80% or more and 90% or less, and the copolymerization ratio of ethyl (meth)acrylate is 10% or more and 20% or less.

(Copolymer B): The copolymer B is a copolymer of methyl (meth)acrylate and ethyl (meth)acrylate. The weight average molecular weight (Mw) of the copolymer B is 45000 or less, the copolymerization ratio of methyl (meth)acrylate constituting the copolymer B is 60% or more and less than 80%, and the copolymerization ratio of the ethyl (meth)acrylate is more than 20% and 40% or less.

Hereinafter, the copolymer A and copolymer B may be collectively referred to as "specific copolymers", optionally.

There is no particular limitation on the glass transition temperature (Tg) of the copolymer A and the copolymer B, and the glass transition temperature is preferably 40° C. or more, more preferably 50° C. or more, particularly preferably 60° C. or more.

The copolymer B is conditioned to have a weight average molecular weight (Mw) of 45000 or less. The copolymer B having a weight average molecular weight (Mw) of 30000 or less, particularly a weight average molecular weight (Mw) of 20000 or less can be preferably used.

According to the thermal transfer sheet 100 of the second embodiment in which the "base layer" contains the above-described "specific copolymers", it is possible to improve the release property when the transfer layer transferred on the transfer receiving article is released from the constituent member in contact with the transfer layer 10 of the thermal transfer sheet 100 (e.g., the substrate 1, when the transfer layer 10 is provided directly on the substrate 1) in a wide applied energy field, and it is possible to improve the release property when the transfer layer 10 is released from the substrate 1, particularly, even in the case where a hot release-type printer is used, in a wide applied energy field. It is thereby possible to suppress various problems caused by an insufficient release property when the transfer layer 10 is released from the substrate 1, for example, the thermal fusion between a transfer receiving article and the thermal transfer sheet, and a reduction in the glossiness of a transferred transfer layer.

Specifically, methyl (meth)acrylate, which is one of the polymerizing components constituting the "specific copolymers", has a property of enhancing the release property when the transfer layer is transferred onto a transfer receiving article with low energy applied, and in contrast, of reducing the release property when the transfer layer 10 is transferred onto a transfer receiving article with high energy applied, as its copolymerization ratio increases. Meanwhile, ethyl (meth)acrylate, which is the other one of polymerizing components constituting the "specific copolymers", has a property of enhancing the release property when the transfer layer 10 is transferred onto a transfer receiving article with high energy applied, and in contrast, of reducing the release property when the transfer layer 10 is transferred onto a transfer receiving article with low energy applied, as its copolymerization ratio increases. Alternatively, in a copolymer prepared by copolymerizing methyl (meth)acrylate and ethyl (meth)acrylate, as its weight average molecular weight (Mw) increases, the release property of the transfer layer when the transfer layer 10 is transferred onto a transfer receiving article with high energy applied tends to decrease.

In the thermal transfer sheet 100 of the second embodiment, with paying attention on the properties of methyl (meth)acrylate and ethyl (meth)acrylate and the weight average molecular weight of the copolymer prepared by copolymerizing these polymerizing components, the copolymerization ratio of methyl (meth)acrylate, which is one of the components constituting the "specific copolymers" is set to be within the range of 60% or more and 90% or less, the copolymerization ratio of ethyl (meth)acrylate, which is the other one of the polymerizing components, is set to be within the range of 10% or more and 40% or less. Additionally, when the copolymerization ratio of methyl (meth)acrylate is 80% or more, a copolymer having a weight average molecular weight (Mw) of 15000 or less is employed as the copolymer, and when the copolymerization ratio of methyl (meth)acrylate is less than 80%, a copolymer having a weight average molecular weight (Mw) of 45000 or less is employed as the copolymer. This has improved the release property when the transfer layer 10 transferred on a transfer receiving article is released from the substrate 1 not only in the case where the transfer layer 10 is transferred onto the transfer receiving article with high energy applied but also in the case where the transfer layer 10 is transferred onto the transfer receiving article with low energy applied. That is, it is possible to enhance the release property of the transfer layer 10 in a wide applied energy field.

Even in the case where the "base layer" contains a copolymer prepared by copolymerizing methyl (meth)acrylate and ethyl (meth)acrylate, if the copolymerization ratio of methyl (meth)acrylate exceeds 90% or if the copolymerization ratio of ethyl (meth)acrylate is less than 10%, in the copolymer, it is not possible to satisfy the release property of the transfer layer when the transfer layer 10 is transferred onto a transfer receiving article with high energy applied. If the copolymerization ratio of methyl (meth)acrylate is less than 60% or if the copolymerization ratio of ethyl (meth)acrylate exceeds 40%, in the copolymer, it is not possible to satisfy the release property of the transfer layer when the transfer layer 10 is transferred onto a transfer receiving article with low energy applied. In the case where the copolymerization ratio of methyl (meth)acrylate is 80% or more and 90% or less, the copolymerization ratio of ethyl (meth)acrylate is 10% or more and 20% or less, but the weight average molecular weight (Mw) of this copolymer is not 15000 or less, or in the case where the copolymerization ratio of methyl (meth)acrylate is 60% or more and less than 80%, the copolymerization ratio of ethyl (meth)acrylate is more than 20% and 40% or less, but the weight average molecular weight (Mw) of this copolymer is not 45000 or less, it is not possible to satisfy the release property of transfer layer when the transfer layer 10 is transferred onto a transfer receiving article with high energy applied.

The upper limit of the weight average molecular weight (Mw) of the copolymer having a copolymerization ratio of methyl (meth)acrylate of 60% or more and less than 80% is set to 45000, whereas the upper limit of the weight average molecular weight (Mw) of the copolymer having a copolymerization ratio of methyl (meth)acrylate of 80% or more and 90% or less is set to 15000. This is because, as the copolymerization ratio of methyl (meth)acrylate increases, the release property of the transfer layer when the transfer layer 10 is transferred onto a transfer receiving article with high energy applied tends to decrease, and in such a case, it is not possible to satisfy the release property of the transfer layer when the transfer layer 10 is transferred onto a transfer receiving article with high energy applied unless the weight average molecular weight (Mw) of the copolymer containing methyl (meth)acrylate is reduced.

The "specific copolymers" may be copolymers of methyl (meth)acrylate, ethyl (meth)acrylate, and any other polymerizing component. There is no particular limitation with respect to other polymerizing components, and alkyl (meth)acrylates such as methyl (meth)acrylate, ethyl (meth)acrylate, butyl (meth)acrylate, isobutyl (meth)acrylate, lauryl (meth)acrylate, isobornyl (meth)acrylate, 2-ethylhexyl (meth)acrylate, and octyl (meth)acrylate, (meth)acrylic esters having a hydroxyl group in the molecule such as 2-hydroxyethyl (meth)acrylate, 2-hydroxybutyl (meth)acrylate, and 2-hydroxy-3-phenoxypropyl (meth)acrylate, and polymerizable monomers such as styrene may be enumerated. There is no particular limitation with respect to the copolymerization ratio of other polymerizing components, and the ratio may be within the range that satisfies the copolymerization ratio of methyl (meth)acrylate and the copolymerization ratio of ethyl (meth)acrylate described above.

There is no particular limitation with respect to the content of "specific copolymers" contained in the "base layer", and it is possible to make the release property of the transfer layer better depending on the amount of the "specific copolymers" contained, in a wide applied energy field. The content is preferably 50% by mass or more, more preferably 70% by mass or more based on the total mass of the "base layer". The upper limit, which is not particularly limited, is 100% by mass.

There is no particular limitation with respect to a method for forming the "base layer". The base layer can be formed by dispersing or dissolving methyl (meth)acrylate, ethyl (meth)acrylate, optional additives used as required, and the like in an appropriate solvent to prepare a coating liquid for base layer, coating this coating liquid for base layer on the substrate 1 or an optional layer located on the substrate 1, and drying the coated liquid. There is no particular limitation with respect to the thickness of the base layer, and the thickness is preferably in the range of 0.1 μm or more and 50 μm or less, more preferably in the range of 0.5 μm or more and 10 μm or less. Setting the thickness of the base layer within this range can more effectively control the release property from the substrate.

The thermal transfer sheet 100 of the first embodiment described above is conditioned to contain "specific isobutyl (meth)acrylate" in the base layer 10A, whereas the thermal transfer sheet 100 of the second embodiment is conditioned to contain "specific copolymers" in the base layer 10A. This is the only difference between the thermal transfer sheet 100 of the first embodiment and the thermal transfer sheet 100 of the second embodiment, and the thermal transfer sheets are the same except for this difference. Accordingly, for the constituents except for this difference, the constituents of the thermal transfer sheet 100 of the first embodiment described above can be appropriately selected and used, and detailed description is omitted here. In other words, the references to the base layer 10A containing "specific isobutyl (meth) acrylate" may be replaced by the base layer 10A containing "specific copolymers".

The thermal transfer sheet 100 of the second embodiment has been described hereinabove. The thermal transfer sheet 100 of the second embodiment is characterized by allowing the release property of the transfer layer better in a wide applied energy field by allowing the "base layer" located nearest the substrate 1 among the layers constituting the transfer layer 10 to contain "specific copolymers". A thermal transfer sheet, if satisfying Condition 1: a transfer layer of a single-layer or a layered structure being provided on one surface of the substrate and Condition 2: the layer located nearest the substrate 1 among the layers constituting the transfer layer containing "specific copolymers", is not limited in any way with respect to any other conditions, and aspects other than those exemplified above may be accepted.

<<Thermal Transfer Sheet of Third Embodiment>>

Figure 4:
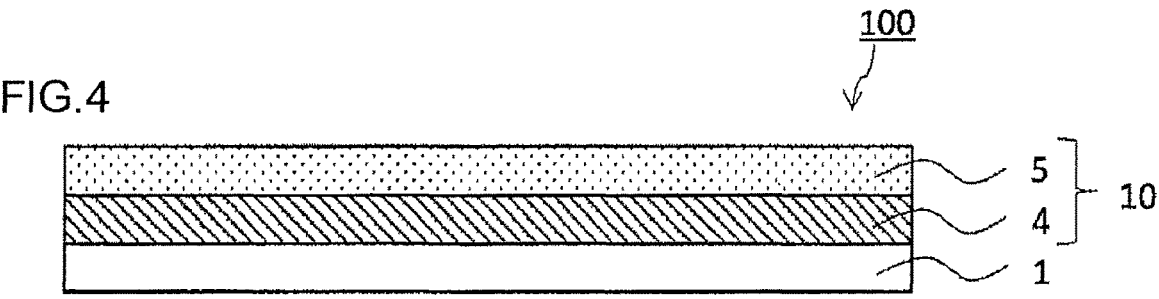
FIG. 4 is a schematic sectional view illustrating one example of the thermal transfer sheet according to an embodiment of the present disclosure.
Figure 5:
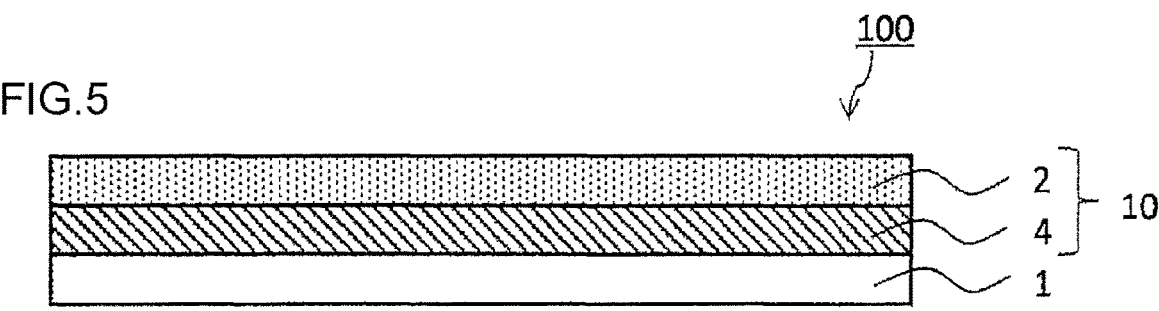
FIG. 5 is a schematic sectional view illustrating one example of the thermal transfer sheet according to an embodiment of the present disclosure.
Figure 6:
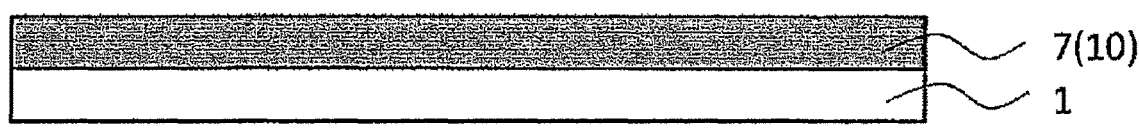
FIG. 6 is a schematic sectional view illustrating one example of the thermal transfer sheet according to an embodiment of the present disclosure.

The thermal transfer sheet according to the third embodiment of the present disclosure (hereinbelow, it is referred to as the thermal transfer sheet of the third embodiment, occasionally) includes a substrate 1 and a transfer layer 10 releasably provided on the substrate 1, as shown in FIGS. 4 to 6.

The thermal transfer sheet 100 of the third embodiment is characterized, in the case where the thermal transfer sheet 100 is superposed on a transfer receiving article, and while the transfer layer 10 is continuously transferred onto the transfer receiving article 300 by use of a printer 200 comprising a thermal transfer sheet supplying device 201, a heating device 202, a thermal transfer sheet winding device 203, a measuring device 204 located between the heating device 202 and the thermal transfer sheet winding device 203 to measure the tensile strength of the thermal transfer sheet conveyed along a conveyance path, and a release device 205 located between the heating device 202 and the measuring device 204, as shown in FIG. 7, under conditions including an applied power for printing: 0.15 W/dot and a conveying speed for the thermal transfer sheet: 84.6 mm/sec., the transfer layer 10 transferred on the transfer receiving article 300 is released from a constituent member in contact with the transfer layer of the thermal transfer sheet 100, by having a tensile strength measured by the measuring device 204 of 0.1 N/cm or less. Hereinbelow, the case where the constituent member in contact with the transfer layer, among constituent members included in the thermal transfer sheet, is the substrate will be mainly described. However, the thermal transfer sheet of the third embodiment is not limited to aspects in which the substrate is in direct contact with the transfer layer, and an optional layer may be provided between the substrate and the transfer layer. In such a case, the optional layer will be the constituent member that comes in direct contact with the transfer layer.

Hereinafter, conditions when the transfer layer 10 transferred on the transfer receiving article 300 is released from the substrate 1, specifically, conditions under which, while the transfer layer 10 is continuously transferred onto the transfer receiving article 300 by use of a printer 200 comprising a thermal transfer sheet supplying device 201, a heating device 202, a thermal transfer sheet winding device 203, a measuring device 204 located between the heating device 202 and the thermal transfer sheet winding device 203 to measure the tensile strength of the thermal transfer sheet 100 conveyed along a conveyance path, and a release device 205 located between the heating device 202 and the measuring device 204, under conditions including an applied power for printing: 0.15 W/dot and a conveying speed for the thermal transfer sheet: 84.6 mm/sec., the transfer layer 10 transferred on the transfer receiving article 300 is released from a constituent member in contact with the transfer layer 10 of the thermal transfer sheet are collectively referred to as "specific measurement conditions".

According to the thermal transfer sheet of the third embodiment having the feature described above, only satisfying a condition of the tensile strength of the thermal transfer sheet of 0.1 N/cm or less under the "specific measurement conditions" can suppress the thermal fusion between a transfer receiving article and the thermal transfer sheet, which may occur when the transfer layer 10 of the thermal transfer sheet 100 is transferred onto the transfer receiving article 300, without being influenced by various conditions when the transfer layer 10 is transferred. Specifically, in order to meet high-speed printing suitability, in the case where energy applied to the thermal transfer sheet is increased, in other words, in the case where applied power for printing is increased, the thermal fusion between a transfer receiving article and the thermal transfer sheet can be suppressed.

More specifically, in order to meet high-speed printing suitability, in the case where energy applied to the thermal transfer sheet is increased, adhesion between the transfer receiving article and the transfer layer increases, and thus, the transfer receiving article and the thermal transfer sheet tend to be thermally fused to each other. However, according to the thermal transfer sheet of the third embodiment, in which the tensile strength of thermal transfer sheet is 0.1 N/cm under the "specific measurement conditions", it is possible to readily release the transfer layer 10 from the constituent member in contact with the transfer layer 10 of the thermal transfer sheet and it is possible to suppress the thermal fusion between a transfer receiving article and the thermal transfer sheet.

Additionally, according to the thermal transfer sheet 100 of the third embodiment capable of suppressing the thermal fusion between a transfer receiving article and the thermal transfer sheet, which may occur when the transfer layer 10 of the thermal transfer sheet 100 is transferred onto the transfer receiving article 300, regardless the transfer conditions, it is possible to suppress occurrence of surface roughness and the like when the transfer layer 10 is released from the substrate 1 of the thermal transfer sheet 100, and it is also possible to suppress a decrease in the glossiness of the transfer layer 10 transferred on the transfer receiving article.

A more preferable thermal transfer sheet of the third embodiment has a tensile strength of the thermal transfer sheet under the "specific measurement conditions" of 0.08 N/cm or less, more preferably 0.07 N/cm or less.

The applied power for printing is set to 0.15 W/dot in the above "specific measurement conditions". This is because, even in the case where the tensile strength of the thermal transfer sheet measured by the measuring device 204 is 0.1 N/cm or less when the applied power for printing is set to less than 0.15 W/dot, it is not possible to suppress the thermal fusion between the transfer receiving article 300 and the thermal transfer sheet 100 when energy applied to the thermal transfer sheet is increased in the case where the transfer layer 10 of the thermal transfer sheet 100 is transferred onto the transfer receiving article 300, unless the tensile strength of the thermal transfer sheet measured by the measuring device 204 is 0.1 N/cm or less when the applied power for printing is set to 0.15 W/dot.

The printer 200 used when the transfer layer 10 of the thermal transfer sheet 100 is transferred onto the transfer receiving article 300, if capable of achieving the "specific measurement conditions", may be a hot release-type printer that melts or softens the transfer layer 10 and releases the transferred transfer layer 10 from the substrate 1 of the thermal transfer sheet 100 before this transfer layer solidifies or may be a cold release-type printer that releases the transfer layer 10 from the substrate 1 of the thermal transfer sheet 100 after the transfer layer 10 solidifies.

In the case where a hot release-type printer is used, in addition to the above "specific measurement conditions", when the transfer layer 10 transferred on the transfer receiving article is released from the substrate 1 of the thermal transfer sheet 100, 0.05 sec. after the transfer layer 10 is transferred onto the transfer receiving article 300, the tensile strength of the thermal transfer sheet measured by the measuring device 204 is preferably 0.1 N/cm or less. According to the thermal transfer sheet 100 of the third embodiment, which satisfies these conditions, even in the case where a hot release-type printer is used and the time after completion of energy application until release of the transfer layer 10 from the substrate 1 is reduced, it is possible to suppress the thermal fusion between the transfer receiving article 300 and the thermal transfer sheet 100. In other words, it is possible to make the release property of the transfer layer better.

Additionally, according to a preferred thermal transfer sheet of the third embodiment, in addition to the above "specific measurement conditions", even in the case where, after the transfer layer 10 is transferred onto the transfer receiving article 300, the transfer layer 10 transferred on the transfer receiving article is taken out of the printer without being released from the substrate 1 of the thermal transfer sheet 100, and the transfer layer 10 transferred on the transfer receiving article is released at 180 degrees from the substrate 1 of the thermal transfer sheet 100 outside the printer, the tensile strength at release is 0.1 N/cm or lees. According to the thermal transfer sheet 100 of this aspect, it is possible to suppress the thermal fusion between the transfer receiving article 300 and the thermal transfer sheet 100 even when a cold release-type printer is used. In other words, it is possible to make the release property of the transfer layer better.

(Printer)

Next, a description will be given on a printer used when the transfer layer 10 is transferred onto the transfer receiving article 300 under the above "specific measurement conditions" and the transfer layer 10 transferred on the transfer receiving article is released from the substrate 1 of the thermal transfer sheet 100.

As shown in FIG. 7, the printer 200 used under the above "specific measurement conditions" includes a thermal transfer sheet supplying roller as a thermal transfer sheet supplying device 201 for conveying the thermal transfer sheet 100 along a predetermined path and a winding roller as a thermal transfer sheet winding device 203, a thermal head as a heating device 202 for heating the back face side of the thermal transfer sheet 100 to transfer the transfer layer 10 onto the transfer receiving article 300, a platen roller 206 that can move the transfer receiving article 300 to the location onto which the transfer layer 10 is transferred, a release plate as a release device 205 that is located between the heating device 202 and the winding device 203 and releases the transfer layer 10 transferred on the transfer receiving article 300 from the substrate 1 after the transfer layer 10 is transferred onto the transfer receiving article 300, and a tension meter as a measuring device 204 that is located between the heating device 202 (release device 205) and the winding device 203 on the conveying path for the thermal transfer sheet 100 and measures the tensile strength applied on the thermal transfer sheet when the transfer layer 10 transferred on the transfer receiving article 300 is released from the substrate 1 while continuously transferring the transfer layer 10 onto the transfer receiving article 300.

Conventionally known printers can be appropriately set and used as the printer 200 used under the above "specific measurement conditions", except that the printer 200 includes a measuring device 204 that is located between the heating device 202 and the winding device 203 on the conveying path for the thermal transfer sheet 100 and measures the tensile strength of the thermal transfer sheet when the transfer layer 10 transferred on the transfer receiving article 300 is released from the substrate 1 while transferring the transfer layer 10 onto the transfer receiving article 300.

The measuring device 204 is only required to be a measuring device that can measure the tensile strength of the thermal transfer sheet running on the conveyance path and a tension meter from OHKURA INDUSTRY (model ASK-1000) can be used. The tensile strength referred to herein is synonymous with tension, and a tensile strength value represents a substantial value of the release force when the transfer layer 10 transferred on the transfer receiving article 300 is released from the substrate 1 after the transfer layer 10 is transferred onto the transfer receiving article 300. According to the printer 200 including the measuring device 204 located between the heating device 202 and the winding device 203, it is possible to measure the tensile strength of the thermal transfer sheet when the transfer layer 10 transferred on the transfer receiving article 300 is released from the substrate 1 while transferring the transfer layer 10 onto the transfer receiving article 300 by means of release device 205. Specifically, it is possible to measure the substantial release force when the transfer layer 10 is released from the constituent member in contact with the transfer layer 10 of the thermal transfer sheet 100 by continuously releasing the transfer layer 10 transferred on the transfer receiving article from the substrate 1 while continuously transferring the transfer layer 10 onto the transfer receiving article 300.

The release device 205 is only required to be located between the heating device 202 and the measuring device 204, and there is no limitation on the location. In the case of a hot release-type printer, the release device is only required to be placed in such a location that the release device 205 reaches the transfer layer 10 transferred on the transfer receiving article 300 after 0.05 sec. In one example, the release device 205 is located at a point 4.5 mm distant from the heating device 202 in the conveying direction. Based on the distance from the heating device 202 to the release device 205 and the conveying speed of the thermal transfer sheet, it is possible to calculate the time until the transfer layer 10 transferred on the transfer receiving article 300 is released by the release device 205.

Then, the specific structure of the thermal transfer sheet 100 having a tensile strength of 0.1 N/cm or less under the above "specific measurement conditions" will be described with reference to one example. The thermal transfer sheet 100 of the third embodiment is only required to satisfy a condition of a tensile strength of 0.1 N/cm or less under the above "specific measurement conditions", and is not limited in any way with respect to any other conditions. There is also no limitation on specific devices to adjust the tensile strength to 0.1 N/cm or less under the above "specific measurement conditions", and it is possible to apply any devices that allow the tensile strength to be 0.1 N/cm or less under the above "specific measurement conditions". Hereinafter, a specific device for allowing the tensile strength to be 0.1 N/cm or less will be described with reference to one example, but the device is not limited thereto.

(First Device)

A first device is a device for adjusting the tensile strength to 0.1 N/cm or less under the above "specific measurement conditions" by appropriately selecting a component to be contained in the transfer layer 10. Specifically, it is a device to enhance the release property of the layer located on the transfer interface, among the layers constituting the transfer layer.

For example, as shown in FIG. 4, in the case where a transfer layer 10 of a layered structure in which an exfoliate layer 4 and an adhesive layer 5 are layered in this order from the side of the substrate 1 is provided on a substrate 1, it is possible to adjust the tensile strength to 0.1 N/cm or less under the above "specific measurement conditions" by selecting an appropriate resin material to be contained in the exfoliate layer 4 located on the transfer interface, for example, considering the molecular weight and glass transition temperature of the resin material, monomers constituting the resin material or the like. As an example, it is possible to adjust the tensile strength to 0.1 N/cm or less under the above "specific measurement conditions" by allowing the exfoliate layer 4 located on the transfer interface to contain a copolymer of methyl methacrylate (MMA) and ethyl methacrylate (EA) having a copolymerization ratio of methyl methacrylate (MMA) of 50% or more and 85% or less on a molar basis and a copolymerization ratio of ethyl methacrylate (EA) of 15% or more and 50% or less on a molar basis or allowing the exfoliate layer 4 to contain a copolymer of methyl methacrylate (MMA) and isobutyl methacrylate (iBMA) having a copolymerization ratio of isobutyl methacrylate (iBMA) of more than 20% on a molar basis.

In addition to this, it is possible to adjust the tensile strength to 0.1 N/cm or less under the above "specific measurement conditions" by combining a resin material to be contained in the transfer layer 10 with a release agent, specifically, appropriately determining a resin material to be contained in the layer located on the transfer interface among the layers constituting the transfer layer 10, type of the release agent, contents of these, and the like. As the release agent, waxes such as polyethylene wax and silicone wax, silicone resins, modified silicone resins, fluorine resins, modified fluorine resins, polyvinyl alcohol, acryl resins, thermally cross-linkable epoxy-amino resin, and thermally cross-linkable alkyd-amino resin may be enumerated.

As the transfer layer 10 of the thermal transfer sheet of the third embodiment, the transfer layer 10 of the thermal transfer sheet of the first embodiment or the second embodiment described above also can be employed to provide a thermal transfer sheet that satisfies a condition of the tensile strength of 0.1 N/cm or less under the "specific measurement conditions". According to the thermal transfer sheet of this aspect, it is possible to more effectively suppress the thermal fusion between a transfer receiving article and the thermal transfer sheet, which may occur when the transfer layer 10 of the thermal transfer sheet 100 is transferred onto the transfer receiving article 300 without being influenced by various conditions when the transfer layer 10 is transferred, while exerting various effects described in the thermal transfer sheets of the above first embodiment and second embodiment.

That is, the thermal transfer sheet of a more preferred aspect is a thermal transfer sheet including a transfer layer 10 located on one surface of a substrate 1, wherein the transfer layer 10 includes one or two or more layers, among the layers constituting the transfer layer 10, a "base layer" located nearest the substrate 1 contains either one or both of (A): (1) a homopolymer of isobutyl (meth)acrylate or (2) a copolymer having a copolymerization ratio of isobutyl (meth)acrylate of 30% or more on a molar basis and (B): a copolymer of methyl (meth)acrylate and ethyl (meth)acrylate. In the copolymer of (B), the copolymerization ratio of methyl (meth)acrylate is 60% or more and 90% or less on a molar basis, and the copolymerization ratio of ethyl (meth)acrylate is 10% or more and 40% or less on a molar basis. When the copolymerization ratio of methyl (meth)acrylate in the copolymer of (B) is 80% or more on a molar basis, the weight average molecular weight (Mw) of the copolymer is 15000 or less. Meanwhile, when the copolymerization ratio of methyl (meth)acrylate in the copolymer of (B) is less than 80% on a molar basis, the weight average molecular weight (Mw) of the copolymer is 45000 or less. Additionally, the thermal transfer sheet 100, in the case where the thermal transfer sheet 100 is superposed on a transfer receiving article 300, and while the transfer layer 10 is continuously transferred onto the transfer receiving article 300 by use of a printer 200 comprising a thermal transfer sheet supplying device 201, a heating device 202, a thermal transfer sheet winding device 203, a measuring device 204 located between the heating device 202 and the thermal transfer sheet winding device 203 to measure the tensile strength of the thermal transfer sheet conveyed along a conveyance path, and a release device 205 located between the heating device 202 and the measuring device 204, under conditions including an applied power for printing: 0.15 W/dot and a conveying speed for the thermal transfer sheet: 84.6 mm/sec., the transfer layer 10 transferred on the transfer receiving article 300 is released from a constituent member in contact with the transfer layer of the thermal transfer sheet 100, has a tensile strength measured by the measuring device 204 of 0.1 N/cm or less.

In summary, in the thermal transfer sheet of the more preferred aspect, the "base layer" contains either one or both of the "specific isobutyl (meth)acrylate" described in the thermal transfer sheet of the first embodiment described above and the "specific copolymers" described in the thermal transfer sheet of the second embodiment described above, and the tensile strength of the thermal transfer sheet under the above "specific measurement conditions" is 0.1 N/cm or less. The thermal transfer sheet of the more preferred aspect may contain one of the "specific isobutyl (meth)acrylate" and "specific copolymers" or may contain both of them. In other words, the thermal transfer sheet of the more preferred aspect has a structure formed by appropriately combining the structure of the thermal transfer sheet of the first embodiment described above with the structure of the thermal transfer sheet of the third embodiment described above, or a structure formed by appropriately combining the structure of the thermal transfer sheet of the second embodiment described above with the structure of the thermal transfer sheet of the third embodiment described above, or a structure formed by appropriately combining the structure of the thermal transfer sheet of the first embodiment described above, the structure of the thermal transfer sheet of the second embodiment described above, and the structure of the thermal transfer sheet of the third embodiment described above.

The preferable contents of the "specific isobutyl (meth) acrylate" and the "specific copolymers" in the case where the thermal transfer sheet of the more preferred aspect contains either one or both of the "specific isobutyl (meth) acrylate" and the "specific copolymers" are as described in the thermal transfer sheet of the first embodiment described above and the thermal transfer sheet of the second embodiment. In the case where the "base layer" contains the "specific isobutyl (meth)acrylate" and the "specific copolymers", the total mass of the "specific isobutyl (meth)acrylate" and the "specific copolymers" based on the total mass of the "base layer" is preferably 30% by mass or more, more preferably 50% by mass or more, still more preferably 70% by mass or more.

(Second Device)

A second device is a device for adjusting the tensile strength under the above "specific measurement conditions" to 0.1 N/cm or less by adjusting the thickness of the substrate 1 and the thickness of an optional layer to be provided on the other surface of the substrate 1, for example, a back face layer. Specifically, it is a device for increasing the thickness of the substrate 1 and the optional layer, which are located nearer the side of the heating member than the transfer layer 10. According to the second device, it is possible to suppress the energy transfer efficiency in which the energy applied from the side of the other surface of the substrate 1 is transferred to the transfer layer 10 to thereby adjust the tensile strength under the above "specific measurement conditions" to 0.1 N/cm or less. It is also possible to suppress the energy transfer efficiency until the energy applied to the other surface of the substrate 1 is transferred to the transfer layer 10 by using materials having a lower energy transfer efficiency as the materials for the substrate 1 and the optional layer provided on the other surface of the substrate 1 instead of the method including adjusting the thickness of the substrate 1 and the optional layer provided on the other surface of the substrate 1.

(Third Device)

A third device is a device for adjusting the tensile strength to 0.1 N/cm or less under the above "specific measurement conditions" by providing an optional layer for enhancing the transferability of the transfer layer 10 between the substrate 1 and the transfer layer 10. As the optional layer, a release layer and the like may be enumerated. It is difficult to adjust the tensile strength under the above "specific measurement conditions" to 0.1 N/cm or less only by the third device. From the viewpoint of adjustment of the tensile strength, it is preferred that the third device be used as an subsidiary device for adjustment of the tensile strength by the first device or the second device described above or be used in combination with a fourth device described below. It is also possible to adjust the tensile strength by a countermeasure to increase the thickness of the release layer and the like, in addition to the material of the release layer.

(Fourth Device)

The fourth device is a device for adjusting the tensile strength to 0.1 N/cm or less under the above "specific measurement conditions" in consideration with the heat resistance of the transfer layer 10 itself. As the device for enhancing the heat resistance of the transfer layer, a method including incorporation of a cured resin cured by a curing agent and the like may be enumerated. It is difficult to adjust the tensile strength under the above "specific measurement conditions" to 0.1 N/cm or less only by the fourth device. From the viewpoint of adjustment of the tensile strength, it is preferred that the fourth device be used as an subsidiary device for adjustment of the tensile strength by the first device or second device described above or be used in combination with the above third device.

Instead of or in addition to enhancing the heat resistance of the transfer layer 10 itself, the heat resistance of the optional layer to be provided on the other surface of the substrate 1 may be enhanced.

It is also possible to adjust the tensile strength to 0.1 N/cm or less under the above "specific measurement conditions" by appropriately combining the first to fourth devices described above. Alternatively, it is possible to adjust the tensile strength to 0.1 N/cm or less under the above "specific measurement conditions" by combination with a method other than these.

Hereinafter, the structure of the thermal transfer sheet 100 of the third embodiment will be described with reference to one example. The thermal transfer sheet 100 of the third embodiment, which is characterized in that the tensile strength under the above "specific measurement conditions" is adjusted to 0.1 N/cm or less by the devices described above or the like, is not limited by the following description with respect to any other conditions.

(Substrate)

The substrate 1 is an essential constituent in the thermal transfer sheet 100 of the third embodiment, and it is provided in order to support the transfer layer 10 provided on one surface of the substrate 1. There is no particular limitation with respect to the substrate 1, and those described in the substrate 1 of the thermal transfer sheet 100 of the first embodiment described above can be appropriately selected and used. Thus, a detailed description for the sheet is omitted here.

There is no particular limitation with respect to the thickness of the substrate 1, and the thickness is generally in the range of 2.5 μm or more and 100 μm or less. It is also possible to adjust the tensile strength to 0.1 N/cm or less under the above "specific measurement conditions" by employing the third device described above to increase the thickness of the substrate 1 more than a thickness in the common range described above.

Alternatively, in order to adjust the adhesion between the substrate 1 and the transfer layer 10, it is also possible to subject the surface of the substrate 1 to various surface treatments, for example, corona discharge treatment, flame treatment, ozone treatment, ultraviolet treatment, radiation treatment, roughening treatment, chemical treatment, plasma treatment, low temperature plasma treatment, primer treatment, and grafting treatment.

(Transfer Layer)

As shown in FIGS. 4 to 6, on one surface of the substrate 1, there is provided a transfer layer 10 releasable from the substrate 1. The transfer layer 10 is an essential constituent in the thermal transfer sheet 100 of the third embodiment.

The transfer layer 10 referred to with respect to the thermal transfer sheet 100 of the third embodiment means a layer to be released from the substrate 1 and transferred onto a transfer receiving article during thermal transfer. The transfer layer 10, if a condition of the tensile strength of the thermal transfer sheet under the above "specific measurement conditions" of 0.1 N/cm or less is satisfied in the end, is not limited in any way with respect to its layer structure and components contained in the transfer layer. The transfer layer 10 may have a layered structure in which two or more layers are layered, as shown in FIGS. 4 and 5, or the transfer layer 10 may have a single-layer structure, as shown in FIG. 6. Hereinafter, the transfer layer 10 constituting the thermal transfer sheet 100 of the third embodiment will be described with reference to one example.

(Transfer Layer of Embodiment A)

A transfer layer 10 of an embodiment A in the thermal transfer sheet of the third embodiment (hereinafter, it is referred to as the transfer layer of the embodiment A) has a layered structure in which an exfoliate layer 4 and an adhesive layer 5 are layered in this order from the side of a substrate 1, as shown in FIG. 4. Instead of the aspect shown in FIG. 4, a protective layer (not shown) may be provided between the exfoliate layer 4 and the adhesive layer 5. Instead of the aspect shown in FIG. 4, it is also possible to provide a transfer layer 10 of a single-layer structure constituted singly by an exfoliate layer 4 with no adhesive layer 5 provided on the exfoliate layer 4 and to impart adhesion to this exfoliate layer 4 itself. The thermal transfer sheet 100 including the transfer layer 10 of the embodiment A serves the function of the protective layer transfer sheet of which transfer layer 10 is transferred onto a transfer receiving article to protect the surface of the transfer receiving article. As the adhesive layer 5 and the protective layer, it is possible to select and use ones conventionally known as materials for adhesive layers and protective layers in the field of intermediate transfer media, protective layer transfer sheets and the like. In the case where the tensile strength under the above "specific measurement conditions" is adjusted to 0.1 N/cm or less by a device other than the first device, conventionally known materials can be appropriately selected and used as the exfoliate layer 4.

(Transfer Layer of Embodiment B)

A transfer layer 10 of an embodiment B in the thermal transfer sheet of the third embodiment (hereinafter, it is referred to as the transfer layer of the embodiment B) has a layered structure in which an exfoliate layer 4 and a receiving layer 2 are layered in this order from the side of a substrate 1, as shown in FIG. 5. The thermal transfer sheet 100 having the transfer layer 10 of the embodiment B serves the function of an intermediate transfer medium for obtaining a print by forming a thermally transferable image on the receiving layer of the thermal transfer sheet and transferring the transfer layer including the receiving layer on which the thermally transferable image is formed onto a transfer receiving article. As the receiving layer 2, it is possible to select and use ones conventionally known in the field of thermal transfer image-receiving sheets and intermediate transfer media.

In the transfer layer 10 of both the embodiment A and the embodiment B, as in the first device described above, in consideration of components and the like that constitutes the transfer layer 10 and that are contained in the exfoliate layer 4 to be the transfer interface, the tensile strength under the above "specific measurement conditions" may be adjusted to 0.1 N/cm or less. Alternatively, the tensile strength may be adjusted to be 0.1 N/cm or less by the second device described above or by an appropriate combination of the first to fourth devices.

(Transfer Layer of Embodiment C)

A transfer layer 10 of an embodiment A in the thermal transfer sheet of the third embodiment (hereinafter, it is referred to as the transfer layer of the embodiment A) has a single-layer structure constituted by a thermally fusible ink layer 7, as shown in FIG. 6. The thermal transfer sheet 100 including the transfer layer 10 of the embodiment C serves a function of transferring a thermally fusible ink layer 7 entirely on a transfer receiving article to form a thermally transferable image on the transfer receiving article.

In the transfer layer 10 of the embodiment C, in consideration of components such as resin materials contained in the thermally fusible ink layer 7 constituting the transfer layer 10, a release agent, and the like and the contents thereof, the tensile strength under the above "specific measurement conditions" may be adjusted to 0.1 N/cm or less. Alternatively, the tensile strength of the transfer layer 10 may be adjusted to be 0.1 N/cm or less by appropriately selecting the second to fourth devices.

Alternatively, different transfer layer 10 may be provided on the same surface of the substrate 1, so as to be layered in parallel on the substrate across the surface of the substrate, as being frame sequentially. For example, there may be provided a thermal transfer sheet 100 in which a thermally fusible ink layer 7 as a transfer layer 10, and a transfer layer 10 of a layered structure in which an exfoliate layer 4 and an adhesive layer 5 are layered in this order are provided on the same surface of the substrate 1, so as to be layered in parallel on the substrate across the surface of the substrate, as being frame sequentially.

(Optional Layers)

The thermal transfer sheet 100 of the third embodiment may include optional layers not constituting the transfer layer. As optional layers, a release layer (not shown) provided between the substrate 1 and the transfer layer 10 in order to improve the transferability of the transfer layer 10, a back face layer provided on the other surface of the substrate 1 in order to improve the heat resistance and the driving stability of heating members such as a thermal head, and the like may be enumerated. For example, in the thermal transfer sheet including the transfer layer 10 of embodiment C described above, a release layer can be provided between the substrate 1 and a thermally fusible ink layer 7 as the transfer layer 10. These optional layers can be provided as subsidiary devices when the tensile strength is adjusted by the first device and second device described above.

EXAMPLES

Next, the present invention will be described more concretely with demonstrating examples and comparative examples. Hereinafter, unless otherwise specified, the expression of "part(s)" or % is based on the mass. Mw means a weight average molecular weight, Tg means a glass transition temperature, and a copolymerization ratio is on a molar basis. MMA means methyl methacrylate, MA means methyl acrylate, EA means ethyl acrylate, iBMA means isobutyl methacrylate, MAA means methacrylic acid, and LA means lauryl acrylate. A MMA-EA copolymer means a copolymer of methyl methacrylate and ethyl acrylate, an iBMA-MA copolymer means a copolymer of isobutyl methacrylate and methyl acrylate, a MMA-iBMA copolymer means a copolymer of methyl methacrylate and isobutyl methacrylate, an iBMA-MAA copolymer means a copolymer of isobutyl methacrylate and methacrylic acid, and a MMA-LA copolymer means a copolymer of methyl methacrylate and lauryl acrylate.

Example 1

Using a polyethylene terephthalate film of 4.5 μm in thickness (Toray Industries, Inc.) as a substrate, a coating liquid for base layer 1 having the following composition was coated onto one surface of the substrate so as to obtain a thickness of 1 μm in dried state, and then the coated liquid was dried, thereby, a base layer was formed. Subsequently, a coating liquid for protective layer 1 having the following composition was coated onto the base layer so as to obtain a thickness of 1 μm in dried state, and then the coated liquid was dried, thereby, a protective layer was formed. Additionally, a coating liquid for back face layer 1 having the following composition was coated onto the other surface of the substrate so as to obtain a thickness of 1 µm in dried state, and then the coated liquid was dried, thereby a back face layer was formed. Thus, a thermal transfer sheet of Example 1 was obtained, wherein a transfer layer including the base layer and the protective layer layered was provided on one surface of the substrate and the back face layer was provided on the other surface of the substrate. The coatings of the coating liquid for base layer 1, the coating liquid for protective layer 1, and the coating liquid for back face layer 1 described above were performed by gravure coating.

<Coating Liquid for Base Layer 1>

| | |
|---|---|
| iBMA homopolymer (Mw: 12500, Tg: 67° C.) | 25 parts |
| Methyl ethyl ketone | 67 parts |
| Normal propyl acetate | 8 parts |
| <Coating liquid for protective layer 1> | |
| Vinyl chloride - vinyl acetate copolymer | 20 parts |
| (SOLBIN(R) CNL, Nissin Chemical Co., Ltd.) | |
| Toluene | 40 parts |
| Methyl ethyl ketone | 40 parts |

<Coating Liquid for Back Face Layer 1>

| | |
|---|---|
| Polyvinyl butyral resin | 10 parts |
| (S-LEC(R) BX-1, SEKISUI CHEMICAL CO., LTD.) | |
| Polyisocyanate curing agent | 2 parts |
| (TAKENATE(R) D218, Mitsui Chemicals, Inc.) | |
| Phosphoric ester | 2 parts |
| (PLYSURF(R) A208S, DKS Co. Ltd.) | |
| Methyl ethyl ketone | 43 parts |
| Toluene | 43 parts |

Example 2

The same procedure as described in Example 1 was repeated, except for replacing the coating liquid for base layer 1 by a coating liquid for base layer 2 having the following composition in order to form the base layer to thereby obtain a thermal transfer sheet of Example 2, in which the transfer layer including the base layer and the protective layer layered was provided on one surface of the substrate and the back face layer was provided on the other surface of the substrate.

<Coating Liquid for Base Layer 2>

| | |
|---|---|
| iBMA homopolymer (Mw: 8750, Tg: 67° C.) | 25 parts |
| Methyl ethyl ketone | 67 parts |
| Normal propyl acetate | 8 parts |

Example 3

The same procedure as described in Example 1 was repeated, except for replacing the coating liquid for base layer 1 by a coating liquid for base layer 3 having the following composition in order to form the base layer to thereby obtain a thermal transfer sheet of Example 3, in which the transfer layer including the base layer and the protective layer layered was provided on one surface of the substrate and the back face layer was provided on the other surface of the substrate.

<Coating Liquid for Base Layer 3>

| | |
|---|---|
| iBMA homopolymer (Mw: 6460, Tg: 67° C.) | 25 parts |
| Methyl ethyl ketone | 67 parts |
| Normal propyl acetate | 8 parts |

Example 4

The same procedure as described in Example 1 was repeated, except for replacing the coating liquid for base layer 1 by a coating liquid for base layer 4 having the following composition in order to form the base layer to thereby obtain a thermal transfer sheet of Example 4, in which the transfer layer including the base layer and the protective layer layered was provided on one surface of the substrate and the back face layer was provided on the other surface of the substrate.

<Coating Liquid for Base Layer 4>

| | |
|---|---|
| iBMA - MA copolymer (Mw: 13500, Tg: 85° C.) | 25 parts |
| (iBMA:MA (copolymerization ratio) = 50:50) | |
| Methyl ethyl ketone | 67 parts |
| Normal propyl acetate | 8 parts |

Example 5

The same procedure as described in Example 1 was repeated, except for replacing the coating liquid for base layer 1 by a coating liquid for base layer 5 having the following composition in order to form the base layer to thereby obtain a thermal transfer sheet of Example 5, in which the transfer layer including the base layer and the protective layer layered was provided on one surface of the substrate and the back face layer was provided on the other surface of the substrate.

<Coating Liquid for Base Layer 5>

| | |
|---|---|
| iBMA - MA copolymer (Mw: 13600, Tg: 93° C.) | 25 parts |
| (iBMA:MA (copolymerization ratio) = 30:70) | |
| Methyl ethyl ketone | 67 parts |
| Normal propyl acetate | 8 parts |

Example 6

Using a polyethylene terephthalate film of 4.5 µm in thickness (Toray Industries, Inc.) as a substrate, a coating liquid for base layer 1 described above was coated onto one surface of the substrate so as to obtain a thickness of 2 µm in dried state, and then the coated liquid was dried, thereby, a base layer was formed. Additionally, the coating liquid for back face layer was coated onto the other surface of the substrate so as to obtain a thickness of 1 µm in dried state, and then the coated liquid was dried, thereby a back face layer was formed. Thus, a thermal transfer sheet of Example 6 was obtained, wherein a transfer layer including only the base layer was provided on one surface of the substrate, and the back face layer was provided on the other surface of the substrate. The coatings of the coating liquid for base layer 1 and the coating liquid for back face layer described above were performed by gravure coating.

Example 7

The same procedure as described in Example 6 was repeated, except for replacing the coating liquid for base layer 1 by the coating liquid for base layer 2 described above in order to form the base layer to thereby obtain a thermal transfer sheet of Example 7, in which the transfer layer including only the base layer was provided on one surface of the substrate and the back face layer was provided on the other surface of the substrate.

Example 8

The same procedure as described in Example 6 was repeated, except for replacing the coating liquid for base layer 1 by the coating liquid for base layer 3 described above in order to form the base layer to thereby obtain a thermal transfer sheet of Example 8, in which the transfer layer including only the base layer was provided on one surface of the substrate and the back face layer was provided on the other surface of the substrate.

Example 9

The same procedure as described in Example 6 was repeated, except for replacing the coating liquid for base layer 1 by the coating liquid for base layer 4 described above in order to form the base layer to thereby obtain a thermal transfer sheet of Example 9, in which the transfer layer including only the base layer was provided on one surface of the substrate and the back face layer was provided on the other surface of the substrate.

Example 10

The same procedure as described in Example 6 was repeated, except for replacing the coating liquid for base layer 1 by the coating liquid for base layer 5 described above in order to form the base layer to thereby obtain a thermal transfer sheet of Example 10, in which the transfer layer including only the base layer was provided on one surface of the substrate and the back face layer was provided on the other surface of the substrate.

Comparative Example 1

The same procedure as described in Example 1 was repeated, except for replacing the coating liquid for base layer 1 by a coating liquid for base layer A having the following composition in order to form the base layer to thereby obtain a thermal transfer sheet of Comparative Example 1, in which the transfer layer including the base layer and the protective layer layered was provided on one surface of the substrate and the back face layer was provided on the other surface of the substrate.
<Coating Liquid for Base Layer A>

| | |
|---|---|
| iBMA - MA copolymer (Mw: 13600, Tg: 93° C.) (iBMA:MA (copolymerization ratio) = 20:80) | 25 parts |
| Methyl ethyl ketone | 67 parts |
| Normal propyl acetate | 8 parts |

Comparative Example 2

The same procedure as described in Example 1 was repeated, except for replacing the coating liquid for base layer 1 by a coating liquid for base layer B having the following composition in order to form the base layer to thereby obtain a thermal transfer sheet of Comparative Example 2, in which the transfer layer including the base layer and the protective layer layered was provided on one surface of the substrate and the back face layer was provided on the other surface of the substrate.
<Coating Liquid for Base Layer B>

| | |
|---|---|
| iBMA - MA copolymer (Mw: 14000, Tg: 101° C.) (iBMA:MA (copolymerization ratio) = 10:90) | 25 parts |
| Methyl ethyl ketone | 67 parts |
| Normal propyl acetate | 8 parts |

Comparative Example 3

The same procedure as described in Example 1 was repeated, except for replacing the coating liquid for base layer 1 by a coating liquid for base layer C having the following composition in order to form the base layer to thereby obtain a thermal transfer sheet of Comparative Example 3, in which the transfer layer including the base layer and the protective layer layered was provided on one surface of the substrate and the back face layer was provided on the other surface of the substrate.
<Coating Liquid for Base Layer C>

| | |
|---|---|
| MMA homopolymer (Mw: 22800, Tg: 105° C.) | 25 parts |
| Methyl ethyl ketone | 67 parts |
| Normal propyl acetate | 8 parts |

(Formation of Thermally Transferable Image)

On the receiving layer of the thermal transfer image-receiving sheet produced by the following method, a black solid image constituted by yellow, magenta, and cyan dyes was printed under the following thermally transferable image forming conditions to obtain a thermally transferable image (formed image). As the yellow, magenta, and cyan dyes, a sublimable type thermal transfer sheet prepared by the following method was used.

(Formation of Thermal Transfer Image-receiving Sheet A)

Onto a porous film layer including a porous polyethylene film of 35 μm in thickness (TOYOPEARL(R) SSP4255, TOYOBO CO., LTD.), a coating liquid for intermediate layer having the following composition was coated by a gravure reverse coating method so as to obtain a thickness of 1.5 μm in dried state, and then the coated liquid was dried, thereby an intermediate layer was formed. Subsequently, a coating liquid for receiving layer having the following composition was coated onto the intermediate layer by the gravure reverse coating method so as to obtain a thickness of 5 μm in dried state, and then the coated liquid was dried, thereby a receiving layer was formed. Onto the surface of the porous polyethylene film opposite to the surface on which the intermediate layer and the receiving layer were provided, a coating liquid for adhesive layer having the following composition was coated by the gravure reverse roll coating method so as to obtain a thickness of 5 μm in dried state, and then the coated liquid was dried, thereby an adhesive layer was formed. The adhesive layer was bonded onto RC paper (155 g/m$^2$, thickness 151 μm) (Mitsubishi Paper Mills Ltd.) to prepare a thermal transfer image-receiving sheet A.

<Coating Liquid for Intermediate Layer>

| | |
|---|---|
| Polyester resin | 50 parts |
| (POLYESTER(R) WR-905, The Nippon Synthetic Chemical Industry Co., Ltd.) | |
| Titanium oxide | 20 parts |
| (TCA888, Tohkem Products Corporation) | |
| Fluorescent whitening agent | 1.2 parts |
| (Uvitex(R) BAC, BASF Japan, Ltd.) | |
| Water | 14.4 parts |
| Isopropyl alcohol | 14.4 parts |

<Coating Liquid for Receiving Layer>

| | |
|---|---|
| Vinyl chloride - vinyl acetate copolymer | 60 parts |
| (SOLBIN(R) C, Nissin Chemical Co., Ltd.) | |
| Epoxy-modified silicone | 1.2 parts |
| (X-22-3000T, Shin-Etsu Chemical Co., Ltd.) | |
| Methyl styl-modified silicone | 0.6 parts |
| (X-24-510, Shin-Etsu Chemical Co., Ltd.) | |
| Methyl ethyl ketone | 2.5 parts |
| Toluene | 2.5 parts |

<Coating Liquid for Adhesive Layer>

| | |
|---|---|
| Urethane resin | 30 parts |
| (TAKELAC(R) A-969V, MITSUI CHEMICALS, INC.) | |
| Isocyanate | 10 parts |
| (TAKENATE(R) A-5, Mitsui Chemicals, Inc.) | |
| Ethyl acetate | 100 parts |

(Preparation of Sublimable Type Thermal Transfer Sheet)

Using a polyethylene terephthalate film of 4.5 μm in thickness subjected to easy-adhesive treatment in advance as a substrate, a coating liquid for heat-resistant slipping layer having the following composition was coated onto this substrate so as to obtain a thickness of 0.8 μm in dried state, and then the coated liquid was dried, thereby a heat-resistant slipping layer was formed. Subsequently, onto the other side of the substrate, a coating liquid for yellow dye layer, a coating liquid for magenta dye layer, and a coating liquid for cyan dye layer were each coated so as to obtain a thickness of 0.6 μm in dried state, so as to be layered in parallel on the substrate across the surface of the substrate, as being frame sequentially, and then the coating liquids were dried, thereby dye layers of each color were formed to obtain a sublimable thermal transfer sheet.

(Coating Liquid for Heat-resistant Slipping Layer)

| | |
|---|---|
| Polyvinyl acetal resin | 60.8 parts |
| (S-LEC(R) KS-1, SEKISUI CHEMICAL CO., LTD.) | |
| Polyisocyanate | 4.2 parts |
| (BURNOCK(R) D750, DIC Corporation) | |
| Filler (zinc stearyl phosphate) | 10 parts |
| (LBT1830 purified, SAKAI CHEMICAL INDUSTRY CO., LTD) | |
| Filler (zinc stearate) | 10 parts |
| (SZ-PF, SAKAI CHEMICAL INDUSTRY CO., LTD.) | |
| Filler (polyethylene wax) | 3 parts |
| (POLYWAX 3000, TOYO ADL CORPORATION) | |
| Filler (ethoxylated alcohol-modified wax) | 7 parts |
| (UNITHOX 750, TOYO ADL CORPORATION) | |
| Toluene | 200 parts |
| Methyl ethyl ketone | 100 parts |

(Coating Liquid for Yellow Dye Layer)

| | |
|---|---|
| Disperse Yellow 201 | 4.0 parts |
| Polyvinyl acetal resin | 3.5 parts |
| (S-LEC(R) KS-5, SEKISUI CHEMICAL CO., LTD.) | |
| Polyethylene wax | 0.1 parts |
| Methyl ethyl ketone | 45.0 parts |
| Toluene | 45.0 parts |

(Coating Liquid for Magenta Dye Layer)

| | |
|---|---|
| Disperse Red 60 | 1.5 parts |
| Disperse Violet 26 | 2.0 parts |
| Polyvinyl acetal resin | 4.5 parts |
| (S-LEC(R) KS-5, SEKISUI CHEMICAL CO., LTD.) | |
| Polyethylene wax | 0.1 parts |
| Methyl ethyl ketone | 45.0 parts |
| Toluene | 45.0 parts |

(Coating Liquid for Cyan Dye Layer)

| | |
|---|---|
| Solvent Blue 63 | 2.0 parts |
| Disperse Blue 354 | 2.0 parts |
| Polyvinyl acetal resin | 3.5 parts |
| (S-LEC(R) KS-5, SEKISUI CHEMICAL CO., LTD.) | |
| Polyethylene wax | 0.1 parts |
| Methyl ethyl ketone | 45.0 parts |
| Toluene | 45.0 parts |

(Thermally Transferable Image Forming Conditions)

| | |
|---|---|
| Thermal head: | F3598 (TOSHIBA HOKUTO ELECTRONICS CORPORATION) |
| Heater average resistance: | 5176 (Ω) |
| Main scanning direction printing density: | 300 (dpi) |
| Sub scanning direction printing density: | 300 (dpi) |
| Applied power for printing: | 0.12 (W/dot) |
| One line cycle: | 2 (msec.) |
| Pulse duty: | 85 (%) |
| Printing start temperature: | 35.5 (° C.) |

(Release Force Evaluation)

The following hot release-type test printer was used to transferring the transfer layer of the thermal transfer sheet of each of Examples and Comparative Examples onto the thermally transferable image (formed image) obtained above to obtain a print of each of Examples and Comparative Examples.

(Test Printer (Hot Release-type))

| | |
|---|---|
| Heater average resistance: | 5241 (Ω) |
| Main scanning direction printing density: | 300 (dpi) |
| Sub scanning direction printing density: | 300 (dpi) |
| Printing voltage: | 28 (V) |
| Applied power for printing: | 0.15 (W/dot) |
| One line cycle: | 1 (msec.) |
| Pulse duty: | 85 (%) |
| Printing start temperature: | 29.0 to 36.0 (° C.) |
| Distance from heating point to release plate: | 4.5 (mm) |
| Conveying speed: | 84.6 (mm/sec.) |
| Printing pressure: | 3.5 to 4.0 (kgf) |
| Evaluation image: | 255-gradation solid image |

To obtain this print, after printing, the tensile strength of the thermal transfer sheet when the thermal transfer sheet of each of Examples and Comparative Examples was released from the formed image was measured by a tension meter (model ASK-1000, OHKURA INDUSTRY) provided between the thermal transfer sheet winding roller and the release plate in the printer. The measurement results of tensile strength (release force) are shown in Table 1. In this method, measuring the tensile strength in a state where the winding speed by the winding roller is controlled to be constant (conveying speed: 84.6 mm/sec.) makes it possible to measure the release force caused by the thermal transfer sheet at release. The case where the release force is less than 0.1 N/cm means that the release property (releasability) of the thermal transfer sheet from the formed image is good and the thermal fusion between the transfer receiving article and the thermal transfer sheet can be suppressed. The tensile strength measured by the tension meter when the transfer layer transferred on the thermal transfer image-receiving sheet A is released from the substrate is synonymous with tension. The value of the tensile strength represents a substantial value of the release force when the transfer layer transferred on thermal transfer image-receiving sheet A is released from the substrate after the transfer layer is transferred onto the thermal transfer image-receiving sheet A.

TABLE 1

| | Release force (N/cm) |
|---|---|
| Example 1 | 0.0080 |
| Example 2 | 0.0073 |
| Example 3 | 0.0084 |
| Example 4 | 0.0300 |
| Example 5 | 0.0649 |
| Example 6 | 0.0253 |
| Example 7 | 0.0134 |
| Example 8 | 0.0139 |
| Example 9 | 0.0247 |
| Example 10 | 0.0647 |
| Comparative Example 1 | 0.1141 |
| Comparative Example 2 | 0.1739 |
| Comparative Example 3 | 0.4748 |

Example 11

The same procedure as described in Example 1 was repeated, except for replacing the coating liquid for base layer 1 by a coating liquid for base layer 11 having the following composition in order to form the base layer to thereby obtain a thermal transfer sheet of Example 11, in which the transfer layer including the base layer and the protective layer layered was provided on one surface of the substrate and the back face layer was provided on the other surface of the substrate.
<Coating Liquid for Base Layer 11>

| MMA - EA copolymer (Mw: 10600, Tg: 75° C.) (MMA:EA (copolymerization ratio) = 83:17) | 25 parts |
|---|---|
| Methyl ethyl ketone | 67 parts |
| Normal propyl acetate | 8 parts |

Example 12

The same procedure as described in Example 1 was repeated, except for replacing the coating liquid for base layer 1 by a coating liquid for base layer 12 having the following composition in order to form the base layer to thereby obtain a thermal transfer sheet of Example 12, in which the transfer layer including the base layer and the protective layer layered was provided on one surface of the substrate and the back face layer was provided on the other surface of the substrate.
<Coating Liquid for Base Layer 12>

| MMA-EA copolymer (Mw: 7920, Tg: 75° C.) (MMA:EA (copolymerization ratio) = 83:17) | 25 parts |
|---|---|
| Methyl ethyl ketone | 67 parts |
| Normal propyl acetate | 8 parts |

Example 13

The same procedure as described in Example 1 was repeated, except for replacing the coating liquid for base layer 1 by a coating liquid for base layer 13 having the following composition in order to form the base layer to thereby obtain a thermal transfer sheet of Example 13, in which the transfer layer including the base layer and the protective layer layered was provided on one surface of the substrate and the back face layer was provided on the other surface of the substrate.
<Coating Liquid for Base Layer 13>

| MMA-EA copolymer (Mw: 19800, Tg: 60° C.) (MMA:EA (copolymerization ratio) = 74:26) | 25 parts |
|---|---|
| Methyl ethyl ketone | 67 parts |
| Normal propyl acetate | 8 parts |

Example 14

The same procedure as described in Example 1 was repeated, except for replacing the coating liquid for base layer 1 by a coating liquid for base layer 14 having the following composition in order to form the base layer to thereby obtain a thermal transfer sheet of Example 14, in which the transfer layer including the base layer and the protective layer layered was provided on one surface of the substrate and the back face layer was provided on the other surface of the substrate.
<Coating Liquid for Base Layer 14>

| MMA-EA copolymer (Mw: 41200, Tg: 48° C.) (MMA:EA (copolymerization ratio) = 65:35) | 25 parts |
|---|---|
| Methyl ethyl ketone | 67 parts |
| Normal propyl acetate | 8 parts |

Example 15

The same procedure as described in Example 1 was repeated, except for replacing the coating liquid for base layer 1 by a coating liquid for base layer 15 having the following composition in order to form the base layer to thereby obtain a thermal transfer sheet of Example 15, in which the transfer layer including the base layer and the protective layer layered was provided on one surface of the substrate and the back face layer was provided on the other surface of the substrate.

<Coating Liquid for Base Layer 15>

| MMA-EA copolymer (Mw: 19900, Tg: 48° C.) (MMA:EA (copolymerization ratio) = 65:35) | 25 parts |
|---|---|
| Methyl ethyl ketone | 67 parts |
| Normal propyl acetate | 8 parts |

Example 16

Using a polyethylene terephthalate film of 4.5 µm in thickness (Toray Industries, Inc.) as a substrate, a coating liquid for base layer 1 having the composition described above was coated onto one surface of the substrate so as to obtain a thickness of 2 µm in dried state, and then the coated liquid was dried, thereby, a base layer was formed. Additionally, the coating liquid for back face layer 1 having the composition described above was coated onto the other surface of the substrate so as to obtain a thickness of 0.8 µm in dried state, and then the coated liquid was dried, thereby a back face layer was formed. Thus, a thermal transfer sheet of Example 16 was obtained, wherein a transfer layer including only the base layer was provided on one surface of the substrate, and a back face layer was provided on the other surface of the substrate. The coatings of the coating liquid for base layer 1 and the coating liquid for back face layer 1 described above were performed by gravure coating.

Example 17

The same procedure as described in Example 16 was repeated, except for replacing the coating liquid for base layer 1 by the coating liquid for base layer 2 having the composition described above in order to form the base layer to thereby obtain a thermal transfer sheet of Example 17, in which the transfer layer including only the base layer was provided on one surface of the substrate and the back face layer was provided on the other surface of the substrate.

Example 18

The same procedure as described in Example 16 was repeated, except for replacing the coating liquid for base layer 1 by the coating liquid for base layer 3 having the composition described above in order to form the base layer to thereby obtain a thermal transfer sheet of Example 18, in which the transfer layer including only the base layer was provided on one surface of the substrate and the back face layer was provided on the other surface of the substrate.

Example 19

The same procedure as described in Example 16 was repeated, except for replacing the coating liquid for base layer 1 by the coating liquid for base layer 4 having the composition described above in order to form the base layer to thereby obtain a thermal transfer sheet of Example 19, in which the transfer layer including only the base layer was provided on one surface of the substrate and the back face layer was provided on the other surface of the substrate.

Example 20

The same procedure as described in Example 16 was repeated, except for replacing the coating liquid for base layer 1 by the coating liquid for base layer 5 having the composition described above in order to form the base layer to thereby obtain a thermal transfer sheet of Example 20, in which the transfer layer including only the base layer was provided on one surface of the substrate and the back face layer was provided on the other surface of the substrate.

Comparative Example 4

The same procedure as described in Example 1 was repeated, except for replacing the coating liquid for base layer 1 by a coating liquid for base layer D having the following composition to form the base layer to thereby obtain a thermal transfer sheet of Comparative Example 4.

<Coating Liquid for Base Layer D>

| MMA-EA copolymer (Mw: 14000, Tg: 96° C.) (MMA:EA (copolymerization ratio) = 95:5) | 25 parts |
|---|---|
| Methyl ethyl ketone | 67 parts |
| Normal propyl acetate | 8 parts |

Comparative Example 5

The same procedure as described in Example 1 was repeated, except for replacing the coating liquid for base layer 1 by a coating liquid for base layer E having the following composition to form the base layer to thereby obtain a thermal transfer sheet of Comparative Example 5.

<Coating Liquid for Base Layer E>

| MMA homopolymer (Mw: 22800, Tg: 105° C.) | 25 parts |
|---|---|
| Methyl ethyl ketone | 67 parts |
| Normal propyl acetate | 8 parts |

Comparative Example 6

The same procedure as described in Example 1 was repeated, except for replacing the coating liquid for base layer 1 by a coating liquid for base layer F having the following composition to form the base layer to thereby obtain a thermal transfer sheet of Comparative Example 6.

<Coating Liquid for Base Layer F>

| MMA homopolymer (Mw: 14000, Tg: 105° C.) | 25 parts |
|---|---|
| Methyl ethyl ketone | 67 parts |
| Normal propyl acetate | 8 parts |

Comparative Example 7

The same procedure as described in Example 1 was repeated, except for replacing the coating liquid for base layer 1 by a coating liquid for base layer G having the following composition to form the base layer to thereby obtain a thermal transfer sheet of Comparative Example 7.

<Coating Liquid for Base Layer G>

| MMA homopolymer (Mw: 9400, Tg: 105° C.) | 25 parts |
|---|---|
| Methyl ethyl ketone | 67 parts |
| Normal propyl acetate | 8 parts |

Comparative Example 8

The same procedure as described in Example 1 was repeated, except for replacing the coating liquid for base layer 1 by a coating liquid for base layer H having the following composition to form the base layer to thereby obtain a thermal transfer sheet of Comparative Example 8.

<Coating Liquid for Base Layer H>

| | |
|---|---|
| MMA homopolymer (Mw: 7040, Tg: 105° C.) | 25 parts |
| Methyl ethyl ketone | 67 parts |
| Normal propyl acetate | 8 parts |

Comparative Example 9

The same procedure as described in Example 1 was repeated, except for replacing the coating liquid for base layer 1 by a coating liquid for base layer I having the following composition to form the base layer to thereby obtain a thermal transfer sheet of Comparative Example 9.

<Coating Liquid for Base Layer I>

| | |
|---|---|
| MMA-EA copolymer (Mw: 16000, Tg: 75° C.) (MMA:EA (copolymerization ratio) = 83:17) | 25 parts |
| Methyl ethyl ketone | 67 parts |
| Normal propyl acetate | 8 parts |

Comparative Example 10

The same procedure as described in Example 1 was repeated, except for replacing the coating liquid for base layer 1 by a coating liquid for base layer J having the following composition to form the base layer to thereby obtain a thermal transfer sheet of Comparative Example 10.

<Coating Liquid for Base Layer J>

| | |
|---|---|
| MMA-EA copolymer (Mw: 63000, Tg: 48° C.) (MMA:EA (copolymerization ratio) = 65:35) | 25 parts |
| Methyl ethyl ketone | 67 parts |
| Normal propyl acetate | 8 parts |

Comparative Example 11

The same procedure as described in Example 1 was repeated, except for replacing the coating liquid for base layer 1 by a coating liquid for base layer K having the following composition to form the base layer to thereby obtain a thermal transfer sheet of Comparative Example 11.

<Coating Liquid for Base Layer K>

| | |
|---|---|
| EA homopolymer (Mw: 21600, Tg: −22° C.) | 25 parts |
| Methyl ethyl ketone | 67 parts |
| Normal propyl acetate | 8 parts |

Comparative Example 12

The same procedure as described in Example 1 was repeated, except for replacing the coating liquid for base layer 1 by a coating liquid for base layer L having the following composition to form the base layer to thereby obtain a thermal transfer sheet of Comparative Example 12.

<Coating Liquid for Base Layer L>

| | |
|---|---|
| MMA-EA copolymer (Mw: 20000, Tg: 29° C.) (MMA:EA (copolymerization ratio) = 50:50) | 25 parts |
| Methyl ethyl ketone | 67 parts |
| Normal propyl acetate | 8 parts |

(Release Force Evaluation)

The test printer described above (hot release-type) was used to transferring the transfer layer of the thermal transfer sheet of each of Examples and Comparative Examples onto the thermally transferable image (formed image) obtained above to obtain a print of each of Examples and Comparative Examples. Prints were formed both at a printing voltage of 23 V (applied power for printing: 0.10 W/dot) and a printing voltage of 28 V (applied power for printing: 0.15 W/dot).

To obtain this print, after printing, the tensile strength of the thermal transfer sheet when the thermal transfer sheet of each of Examples and Comparative Examples was released from the formed image was measured by a tension meter (model ASK-1000, OHKURA INDUSTRY) provided between the thermal transfer sheet winding roller and the release plate in the printer. The measurement results of tensile strength (release force) are shown in Table 2. In this method, measuring the tensile strength in a state where the winding speed by the winding roller is controlled to be constant (conveying speed: 84.6 mm/sec.) makes it possible to measure the release force caused by the thermal transfer sheet at release. The case where the release force is less than 0.1 N/cm means that the release property (releasability) of the thermal transfer sheet from the formed image is good and thermal fusion between the transfer receiving article and the thermal transfer sheet can be suppressed. The tensile strength measured by the tension meter when the transfer layer transferred on the thermal transfer image-receiving sheet A is released from the substrate is synonymous with tension. The value of the tensile strength represents a substantial value of the release force when the transfer layer transferred on thermal transfer image-receiving sheet A is released from the substrate after the transfer layer is transferred onto the thermal transfer image-receiving sheet A.

TABLE 2

| | Polymer (including copolymer) | | | | Release force (N/cm) Printing voltage | |
|---|---|---|---|---|---|---|
| | Copolymerization ratio % (on a molar basis) | | | | | |
| | MMA | EA | Mw | Tg (° C.) | 23 V | 28 V |
| Example 11 | 83 | 17 | 10600 | 75 | 0.008 | 0.081 |
| Example 12 | 83 | 17 | 7920 | 75 | 0.008 | 0.063 |
| Example 13 | 74 | 26 | 19800 | 60 | 0.011 | 0.077 |

TABLE 2-continued

| | Polymer (including copolymer) | | | | Release force (N/cm) Printing voltage | |
|---|---|---|---|---|---|---|
| | Copolymerization ratio % (on a molar basis) | | | | | |
| | MMA | EA | Mw | Tg (° C.) | 23 V | 28 V |
| Example 14 | 65 | 35 | 41200 | 48 | 0.023 | 0.064 |
| Example 15 | 65 | 35 | 19900 | 48 | 0.012 | 0.031 |
| Example 16 | 83 | 17 | 10600 | 75 | 0.009 | 0.047 |
| Example 17 | 83 | 17 | 7920 | 75 | 0.010 | 0.027 |
| Example 18 | 74 | 26 | 19800 | 60 | 0.018 | 0.080 |
| Example 19 | 65 | 35 | 41200 | 48 | 0.024 | 0.067 |
| Example 20 | 65 | 35 | 19900 | 48 | 0.020 | 0.034 |
| Comparative Example 4 | 95 | 5 | 14000 | 96 | 0.017 | 0.198 |
| Comparative Example 5 | 100 | — | 22800 | 105 | 0.026 | 0.475 |
| Comparative Example 6 | 100 | — | 14000 | 105 | 0.019 | 0.233 |
| Comparative Example 7 | 100 | — | 9400 | 105 | 0.013 | 0.177 |
| Comparative Example 8 | 100 | — | 7040 | 105 | 0.010 | 0.145 |
| Comparative Example 9 | 83 | 17 | 16000 | 75 | 0.011 | 0.109 |
| Comparative Example 10 | 65 | 35 | 60300 | 48 | 0.020 | 0.165 |
| Comparative Example 11 | 0 | 100 | 21600 | −22 | 0.150 | 0.055 |
| Comparative Example 12 | 50 | 50 | 20000 | 29 | 0.112 | 0.097 |

(Preparation of Thermal Transfer Sheet 1)

Using a polyethylene terephthalate film of 4.5 μm in thickness (Toray Industries, Inc.) as a substrate, a coating liquid for transfer layer 1 having the following composition was coated onto one surface of the substrate so as to obtain a thickness of 1 μm in dried state, and then the coated liquid was dried, thereby, a transfer layer was formed. Additionally, the coating liquid for back face layer 2 having the following composition was coated onto the other surface of the substrate so as to obtain a thickness of 1 μm in dried state, and then the coated liquid was dried, thereby a back face layer was formed. Thus, a thermal transfer sheet 1 was obtained, wherein a transfer layer was provided on one surface of the substrate, and a back face layer was provided on the other surface of the substrate. The coatings of the coating liquid for transfer layer 1 and the coating liquid for back face layer described above were performed by gravure coating.

<Coating Liquid for Transfer Layer 1>

| MMA-EA copolymer (Mw: 8000, Tg: 75° C.) (MMA: EA (copolymerization ratio) = 83:17) | 25 parts |
|---|---|
| Methyl ethyl ketone | 67 parts |
| Normal propyl acetate | 8 parts |

<Coating liquid for back face layer 2>

| Polyvinyl butyral resin (S-LEC(R) BX-1, SEKISUI CHEMICAL CO., LTD.) | 10 parts |
|---|---|
| Polyisocyanate curing agent (TAKENATE(R) D218, Mitsui Chemicals, Inc.) | 2 parts |
| Phosphoric ester (PLYSURF(R) A208S, DKS Co. Ltd.) | 2 parts |
| Methyl ethyl ketone | 43 parts |
| Toluene | 43 parts |

(Preparation of Thermal Transfer Sheet 2)

The same procedure as described in Preparation of thermal transfer sheet 1 was repeated, except for replacing the coating layer for transfer layer 1 by a coating layer for transfer layer 2 having the following composition in order to form the transfer layer to thereby obtain a thermal transfer sheet 2, in which the transfer layer was provided on one surface of the substrate, and the back face layer was provided on the other surface of the substrate.

<Coating Liquid for Transfer Layer 2>

| MMA-EA copolymer (Mw: 41200, Tg: 48° C.) (MMA:EA (copolymerization ratio) = 65:35) | 25 parts |
|---|---|
| Methyl ethyl ketone | 67 parts |
| Normal propyl acetate | 8 parts |

(Preparation of Thermal Transfer Sheet 3)

The same procedure as described in Preparation of thermal transfer sheet 1 was repeated, except for replacing the coating layer for transfer layer 1 by a coating layer for transfer layer 3 having the following composition in order to form the transfer layer to thereby obtain a thermal transfer sheet 3, in which the transfer layer was provided on one surface of the substrate, and the back face layer was provided on the other surface of the substrate.

<Coating Liquid for Transfer Layer 3>

| iBMA homopolymer (Mw: 12500, Tg: 67° C.) | 25 parts |
|---|---|
| Methyl ethyl ketone | 67 parts |
| Normal propyl acetate | 8 parts |

(Preparation of Thermal Transfer Sheet 4)

The same procedure as described in Preparation of thermal transfer sheet 1 was repeated, except for replacing the coating layer for transfer layer 1 by a coating layer for transfer layer 4 having the following composition in order to form the transfer layer to thereby obtain a thermal transfer sheet 4, in which the transfer layer was provided on one surface of the substrate, and the back face layer was provided on the other surface of the substrate.
<Coating Liquid for Transfer Layer 4>

| | |
|---|---|
| MMA - iBMA copolymer (Mw: 13500, Tg: 85° C.) (MMA:iBMA (copolymerization ratio) = 50:50) | 25 parts |
| Methyl ethyl ketone | 67 parts |
| Normal propyl acetate | 8 parts |

(Preparation of Thermal Transfer Sheet 5)

The same procedure as described in Preparation of thermal transfer sheet 1 was repeated, except for replacing the coating layer for transfer layer 1 by a coating layer for transfer layer 5 having the following composition in order to form the transfer layer to thereby obtain a thermal transfer sheet 5, in which the transfer layer was provided on one surface of the substrate, and the back face layer was provided on the other surface of the substrate.
<Coating Liquid for Transfer Layer 5>

| | |
|---|---|
| iBMA - MAA copolymer (Mw: 12500, Tg: 81° C.) (iBMA:MAA (copolymerization ratio) = 85:15) | 25 parts |
| Methyl ethyl ketone | 67 parts |
| Normal propyl acetate | 8 parts |

(Preparation of Thermal Transfer Sheet 6)

The same procedure as described in Preparation of thermal transfer sheet 1 was repeated, except for using a polyethylene terephthalate film of 5.7 μm in thickness (Toray Industries, Inc.) instead of a polyethylene terephthalate film of 4.5 μm in thickness (Toray Industries, Inc.) and replacing the coating layer for transfer layer 1 by a coating layer for transfer layer 6 having the following composition in order to form the transfer layer to thereby obtain a thermal transfer sheet 6, in which the transfer layer was provided on one surface of the substrate, and the back face layer was provided on the other surface of the substrate.
<Coating Liquid for Transfer Layer 6>

| | |
|---|---|
| MMA homopolymer (Mw: 12500, Tg: 81° C.) | 25 parts |
| Methyl ethyl ketone | 67 parts |
| Normal propyl acetate | 8 parts |

(Preparation of Thermal Transfer Sheet 7)

The same procedure as described in Preparation of thermal transfer sheet 1 was repeated, except for replacing the coating liquid for transfer layer 1 by the coating liquid for transfer layer 6 having the composition described above to form a transfer layer and coating the coating liquid for back face layer so as to obtain a thickness of 2 μm in dried state and drying the coated liquid in order to obtain a back surface layer to thereby obtain a thermal transfer sheet 7, in which the transfer layer was provided on one surface of the substrate, and the back face layer was provided on the other surface of the substrate.

(Preparation of Thermal Transfer Sheet A)

The same procedure as described in Preparation of thermal transfer sheet 1 was repeated, except for replacing the coating layer for transfer layer 1 by a coating layer for transfer layer 6 having the composition described above in order to form the transfer layer to thereby obtain a thermal transfer sheet A, in which the transfer layer was provided on one surface of the substrate, and the back face layer was provided on the other surface of the substrate.

(Preparation of Thermal Transfer Sheet B)

The same procedure as described in Preparation of thermal transfer sheet 1 was repeated, except for replacing the coating layer for transfer layer 1 by a coating layer for transfer layer A having the following composition in order to form the transfer layer to thereby obtain a thermal transfer sheet B, in which the transfer layer was provided on one surface of the substrate, and the back face layer was provided on the other surface of the substrate.
<Coating Liquid for Transfer Layer A>

| | |
|---|---|
| MMA - iBMA copolymer (Mw: 13500, Tg: 97° C.) (MMA:iBMA (copolymerization ratio) = 80:20) | 25 parts |
| Methyl ethyl ketone | 67 parts |
| Normal propyl acetate | 8 parts |

(Preparation of Thermal Transfer Sheet C)

The same procedure as described in Preparation of thermal transfer sheet 1 was repeated, except for replacing the coating layer for transfer layer 1 by a coating layer for transfer layer B having the following composition in order to form the transfer layer to thereby obtain a thermal transfer sheet C, in which the transfer layer was provided on one surface of the substrate, and the back face layer was provided on the other surface of the substrate.
<Coating Liquid for Transfer Layer B>

| | |
|---|---|
| MMA - LA copolymer (Mw: 17500, Tg: 60° C.) (MMA:LA (copolymerization ratio) = 84:16) | 25 parts |
| Methyl ethyl ketone | 67 parts |
| Normal propyl acetate | 8 parts |

(Preparation of Thermal Transfer Image-receiving Sheet 1)

A coating liquid for back face primer layer was coated onto one surface of a substrate (coated paper, thickness of 170 μm, DAIO PAPER CORPORATION) so as to obtain a thickness of 1.2 μm in dried state, and then the coated liquid was dried at 110° C. for one minute, thereby a back face primer layer was formed. A coating liquid for back face layer having the following composition was coated onto this back face primer layer so as to obtain a thickness of 1 μm in dried state, and then the coated liquid was dried at 110° C. for one minute, thereby a back face layer was formed. Subsequently, a coating liquid for filling layer having the following composition was coated onto the other surface of the substrate so as to obtain a thickness of 1 μm in dried state, and then the coated liquid was dried at 110° C. for one minute, thereby a filling layer was formed. A coating layer for porous layer having the following composition was coated onto this filling layer so as to obtain a thickness of 30 μm in dried state, and then the coated liquid was dried at 110° C. for two minutes, thereby, a porous layer was formed. Then, a coating liquid for barrier layer having the following composition was coated onto the porous layer so as to obtain a thickness of 0.5 μm in dried state, and then the coated liquid was dried at 110° C. for one minute, thereby a barrier layer was formed. A coating liquid for antistatic layer having the same composition as that of the above-described back face primer layer was coated onto this barrier layer so as to obtain a thickness of 1.5 μm in dried state, and then the coated liquid was dried at 110° C. for one minute, thereby an antistatic layer was formed. Subsequently, a coating liquid for receiving layer 1 having the following composition was coated onto the antistatic layer so as to obtain a thickness of 3 μm in dried state and then the coated liquid was dried at 110° C. for one minute, thereby a receiving layer was formed. Thus, there was obtained a thermal transfer image-receiving sheet 1 in which the back face primer layer and the back face layer were layered in this order on one surface of the substrate, and the filling layer, the porous layer, the barrier layer, the antistatic layer, and the receiving layer were layered in this order on the other surface of the substrate.

<Coating Liquid for Back Face Primer>

| | |
|---|---|
| Polyester resin (solid content 25%) (VYLONAL(R) MD-1480, TOYOBO CO., LTD.) | 40 parts |
| Filler (LAPONITE JS, Wilbur-Ellis) | 9 parts |
| Surfactant (DINOL 604, Shin-Etsu Chemical Co., Ltd.) | 0.08 parts |
| Isopropyl alcohol | 66.7 parts |
| Water | 133.3 parts |

<Coating Liquid for Back Face Layer>

| | |
|---|---|
| Polyvinyl butyral (BL-7, SEKISUI CHEMICAL CO., LTD.) | 36 parts |
| Nylon filler (Average particle size 4 μm) (MW330, SHINTO PAINT CO., LTD.) | 7 parts |
| Toluene | 150 parts |
| Isopropyl alcohol | 150 parts |

<Coating Liquid for Filling Layer>

| | |
|---|---|
| Polyester resin (Vylon(R) 200, TOYOBO CO., LTD.) | 10 parts |
| Methyl ethyl ketone | 10 parts |
| Toluene | 10 parts |

<Coating Liquid for Porous Layer>

| | |
|---|---|
| Hollow particle (solid content 36%) (Average particle size 3.5 μm, hollow ratio 82% by volume) (Microsphere, Matsumoto Yushi-Seiyaku Co., Ltd) | 100 parts |
| Acrylic ester-based latex (solid content 45%) (SX1707A, Nippon Zeon Co., Ltd.) | 133 parts |
| Surfactant (DINOL 604, Shin-Etsu Chemical Co., Ltd.) | 2 parts |
| Isopropyl alcohol | 60 parts |
| Water | 140 parts |

<Coating Liquid for Barrier Layer>

| | |
|---|---|
| Acrylic resin (solid content 37%) (BONRON(R) B4100, Mitsui Chemicals, Inc.) | 40 parts |
| Polyester resin (solid content 20%) (WR905, The Nippon Synthetic Chemical Industry Co., Ltd.) | 10 parts |
| Anatase-type titanium oxide (TCA-888, SAKAI CHEMICAL INDUSTRY CO., LTD.) | 1 part |
| Isopropyl alcohol | 25 parts |
| Water | 25 parts |

<Coating Liquid for Receiving Layer 1>

| | |
|---|---|
| Hydroxyl group-containing acrylic resin (solid content 26%) (Hydroxy value 29.7 mgKOH/g, AH90A, Fujikura Kasei Co., Ltd. ) | 100 parts |
| Isocyanate compound (solid content 75%) (TAKENATE D110N, Mitsui Chemicals, Inc.) | 1.74 parts |
| Both end carbinol (ROH)-modified silicone oil (KF6003, Shin-Etsu Chemical Co., Ltd.) | 0.13 parts |
| Silica particulates (average particle size 2.7 μm) (Sylysia 310P, Fuji Silysia Chemical Ltd.) | 0.128 parts |
| Methyl ethyl ketone | 10 parts |
| Toluene | 10 parts |

(Preparation of Thermal Transfer Image-receiving Sheet 2)

As a porous film for forming a porous layer, a porous polypropylene film (thickness 38 μm, density 0.7 g/cm$^3$) was provided. As a substrate layer, white paper (uncoated paper, thickness 150 μm, (Mitsubishi Paper Mills Ltd.) as a paper substrate was provided. A mixed resin (mix ratio 8:2, density 0.949 g/cm$^3$) of a high density polyethylene resin (density 0.956 g/cm$^3$) and a low density polyethylene resin (density 0.919 g/cm$^3$) was extruded onto a surface of the white paper by an extrusion lamination method to form a second polyolefin resin layer (thickness 30 μm). Subsequently, the porous polypropylene film and white paper described above were bonded onto the surface opposite to the second polyolefin resin layer on the substrate layer while the low density polyethylene resin described above was extruded to form a first polyolefin resin layer (thickness 15 μm) constituted by the low density polyethylene resin between the porous layer and the substrate layer, thereby a support for thermal transfer image-receiving sheet was obtained. Then, a coating liquid for primer layer having the following composition was coated onto the porous polypropylene film by a gravure coater so as to obtain a thickness of 2 μm in dried state, and then the coated liquid was dried at 110° C. for one minutes, and then, a coating liquid for receiving layer 2 having the following composition was coated thereon by a gravure coater so as to obtain a thickness of 4 μm in dried state, and then the coated liquid was dried at 110° C. for one minute to form a primer layer and a receiving layer, thereby a thermal transfer image-receiving sheet 2 was obtained.

<Coating Liquid for Primer Layer>

| | |
|---|---|
| Polyester resin (WR-905, The Nippon Synthetic Chemical Industry Co., Ltd. ) | 13.1 parts |
| Titanium oxide (TCA-888, Tohkem Products Corporation) | 26.2 parts |
| Fluorescent whitening agent (benzimidazole derivative) (Uvitex (R) BAC, BASF Japan, Ltd.) | 0.39 parts |
| Water | 40 parts |
| Isopropyl alcohol | 20 parts |

<Coating Liquid for Receiving Layer 2>

| | |
|---|---|
| Vinyl chloride - vinyl acetate copolymer (SOLBIN(R) C, Nissin Chemical Co., Ltd.) | 60 parts |
| Epoxy-modified silicone (X-22-3000T, Shin-Etsu Chemical Co., Ltd.) | 1.2 parts |
| Methyl styl-modified silicone (24-510, Shin-Etsu Chemical Co., Ltd.) | 0.6 parts |
| Methyl ethyl ketone | 2.5 parts |
| Toluene | 2.5 parts |

(Measurement of Hot Tensile Strength (Measurement of Hot Release Force))

The thermal transfer sheets and thermal transfer image-receiving sheets each formed above were combined in accordance with combinations shown in Table 3 below.

While the transfer layer of the thermal transfer sheet was transferred onto the thermal transfer image-receiving sheet using the following hot release-type test printer 1, the transfer layer transferred was released from the substrate to obtain a print in which the transfer layer was provided on the thermal transfer image-receiving sheet. When this print was obtained, the tensile strength of the thermal transfer sheet when the transfer layer transferred on the thermal image-receiving sheet was released from the substrate was measured by a tension meter (model ASK-1000, OHKURA INDUSTRY) provided between the thermal transfer sheet winding roller and the heating device (thermal head) in the printer. The measurement results of the tensile strength are shown in Table 3. Also in Table 3, combinations of a thermal transfer sheet and a thermal transfer image-receiving sheet both having a hot tensile strength (hot release force) and a cold tensile strength (cold release) described below of 0.1 N/cm or less are taken as Examples, and combinations of a thermal transfer sheet and a thermal transfer image-receiving sheet having a hot tensile strength (hot release force) and a cold tensile strength (cold release force) described below, either one or both of which exceed 0.1 N/cm, are taken as Comparative Examples.

(Test Printer 1 (Hot Release-type))
    Heater average resistance: 5241 (Ω)
    Main scanning direction printing density: 300 (dpi)
    Sub scanning direction printing density: 300 (dpi)
    Printing voltage: 28 (V)
    Applied power for printing: 0.15 (W/dot)
    One line cycle: 1 (msec.)
    Pulse duty: 85(%)
    Printing start temperature: 29.0 to 36.0 (° C.)
    Distance from heating point to release plate: 4.5 (mm)
    Conveying speed: 84.6 (mm/sec.)
    Printing pressure: 3.5 to 4.0 (kgf)
    Evaluation image: 255-gradation solid image (Measurement of Cold Tensile Strength (Measurement of Cold Release Force))

The thermal transfer sheets and thermal transfer image-receiving sheets each formed above were combined in accordance with combinations shown Table 3 below. After the transfer layer of the thermal transfer sheet was transferred onto the thermal transfer image-receiving sheet using the following test printer 2, the transfer layer transferred on the thermal transfer image-receiving sheet was removed from the test printer 2 without being released from the substrate, and the tensile strength when the transfer layer transferred on the thermal transfer image-receiving sheet was released from the substrate was measured by the following release equipment under the following release conditions. The measurement results are also shown in Table 3. The test printer 2 has the same structure as the test printer 1 except for including no release plate and tension meter.

Release equipment: HEIDON-14DR, Shinto Scientific Co., Ltd.
    Release speed: 5 (m/min.)
    Release angle: 180 (degrees)

(Test Printer 2)
    Heater average resistance: 5241 (Ω)
    Main scanning direction printing density: 300 (dpi)
    Sub scanning direction printing density: 300 (dpi)
    Printing voltage: 28 (V)
    Applied power for printing: 0.15 (W/dot)
    One line cycle: 1 (msec.)
    Pulse duty: 85(%)
    Printing start temperature: 29.0 to 36.0 (° C.)
    Conveying speed: 84.6 (mm/sec.)
    Printing pressure: 3.5 to 4.0 (kgf)
    Evaluation image: 255-gradation solid image (Thermal Fusion Evaluation)

The combinations of a thermal transfer sheet and a thermal transfer image-receiving sheet of each of Examples and Comparative Examples shown in Table 3 were evaluated for the thermal fusion when the transfer layer was transferred onto the thermal transfer image-receiving sheet using the hot release-type test printer 1 described above in accordance with the following evaluation criteria. The evaluation results are also shown in Table 3.

"Evaluation criteria"

A: No thermal fusion occurs, and the transfer layer can be well released from the substrate.

NG: Thermal fusion occurs partially or entirely in the transfer layer, and it is not possible to release the transfer layer partially or entirely from the substrate.

TABLE 3

| | Thermal transfer sheet | Thermal transfer image-receiving sheet | Tensile strength (N/cm) | | Thermal fusion |
|---|---|---|---|---|---|
| | | | Cold | Hot | |
| Example 21 | Thermal transfer sheet 1 | Thermal transfer image-receiving sheet 1 | 0.018 | 0.049 | A |
| Example 22 | Thermal transfer sheet 1 | Thermal transfer image-receiving sheet 2 | 0.020 | 0.052 | A |
| Example 23 | Thermal transfer sheet 2 | Thermal transfer image-receiving sheet 1 | 0.024 | 0.065 | A |
| Example 24 | Thermal transfer sheet 3 | Thermal transfer image-receiving sheet 1 | 0.016 | 0.025 | A |
| Example 25 | Thermal transfer sheet 4 | Thermal transfer image-receiving sheet 1 | 0.010 | 0.024 | A |
| Example 26 | Thermal transfer sheet 5 | Thermal transfer image-receiving sheet 1 | 0.007 | 0.016 | A |
| Example 27 | Thermal transfer sheet 6 | Thermal transfer image-receiving sheet 1 | 0.019 | 0.091 | A |
| Example 28 | Thermal transfer sheet 7 | Thermal transfer image-receiving sheet 1 | 0.023 | 0.096 | A |
| Comparative Example 13 | Thermal transfer sheet A | Thermal transfer image-receiving sheet 1 | 0.029 | 0.738 | NG |
| Comparative Example 14 | Thermal transfer sheet B | Thermal transfer image-receiving sheet 1 | 0.011 | 0.107 | NG |
| Comparative Example 15 | Thermal transfer sheet C | Thermal transfer image-receiving sheet 1 | 0.008 | 0.276 | NG |
| Comparative Example 16 | Thermal transfer sheet C | TThermal transfer image-receiving sheet 2 | 0.009 | 0.273 | NG |

REFERENCE SIGNS LIST

1 Substrate
2 Receiving layer
3 Protective layer
4 Exfoliate layer
5 Adhesive layer
7 Thermally fusible ink layer
10A Base layer
10 Transfer layer
100 Thermal transfer sheet
200 Printer 201 Thermal transfer sheet supplying device
202 Heating device
203 Thermal transfer sheet winding device
204 Measuring device
205 Release device
300 Transfer receiving article

The invention claimed is:

1. A thermal transfer sheet comprising a transfer layer provided on one surface of a substrate,
wherein the transfer layer includes one or two or more layers,
wherein among the layers constituting the transfer layer, a layer located nearest the substrate comprises (1) a homopolymer of isobutyl (meth)acrylate or (2) a copolymer having a copolymerization ratio of isobutyl (meth)acrylate of 30 mol % or more on a molar basis, and
wherein a content of the homopolymer of isobutyl (meth)acrylate or the copolymer having the copolymerization ratio of isobutyl (meth)acrylate of 30 mol % or more is equal to or more than 50 mass % with respect to a total mass of the layer located nearest the substrate.

2. A thermal transfer sheet including a transfer layer provided on one surface of a substrate,
wherein the transfer layer includes one or two or more layers,
wherein among the layers constituting the transfer layer, the layer located nearest the substrate comprises a copolymer of methyl (meth)acrylate and ethyl (meth)acrylate,
wherein the copolymerization ratio of methyl (meth)acrylate in the copolymer is 60% or more and 90% or less on a molar basis, the copolymerization ratio of ethyl (meth)acrylate is 10% or more and 40% or less on a molar basis,
wherein when the copolymerization ratio of the methyl (meth)acrylate in the copolymer is 80% or more on a molar basis, the weight average molecular weight (Mw) of the copolymer is 15000 or less, and
wherein when the copolymerization ratio of the methyl (meth)acrylate in the copolymer is less than 80% or less on a molar basis, the weight average molecular weight (Mw) of the copolymer is 45000 or less.

* * * * *